United States Patent
Peng et al.

(10) Patent No.: US 11,225,793 B2
(45) Date of Patent: Jan. 18, 2022

(54) FLY ASH-FREE COATING FORMULATION FOR FIBROUS MAT TILE BACKERBOARD

(71) Applicant: UNITED STATES GYPSUM COMPANY, Chicago, IL (US)

(72) Inventors: Yanfei Peng, Hawthorn Woods, IL (US); Rafael Bury, Wheeling, IL (US); Jeffrey W. Donelan, Highland Park, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 16/371,722

(22) Filed: Apr. 1, 2019

(65) Prior Publication Data

US 2019/0330846 A1  Oct. 31, 2019

Related U.S. Application Data

(60) Provisional application No. 62/663,649, filed on Apr. 27, 2018.

(51) Int. Cl.
  *E04C 2/04* (2006.01)
  *B32B 13/12* (2006.01)
  (Continued)

(52) U.S. Cl.
  CPC .............. *E04C 2/044* (2013.01); *B32B 13/12* (2013.01); *B32B 27/20* (2013.01); *C04B 28/04* (2013.01);
  (Continued)

(58) Field of Classification Search
  None
  See application file for complete search history.

(56) References Cited

U.S. PATENT DOCUMENTS

| 4,488,909 A | 12/1984 | Galer et al. |
| 4,504,335 A | 3/1985 | Galer |

(Continued)

FOREIGN PATENT DOCUMENTS

| WO | 2010106444 A1 | 9/2010 |
| WO | 2016081903 A1 | 5/2016 |

OTHER PUBLICATIONS

Wikipedia (https://en.wikipedia.org/wiki/Polyvinyl_acetate, page visited on Sep. 22, 2020 (Year: 2020).*

(Continued)

*Primary Examiner* — Shawn Mckinnon
(74) *Attorney, Agent, or Firm* — Vorys, Sater, Seymour and Pease LLP; Pradip Sahu; Philip T. Petti

(57) ABSTRACT

Mat-faced cementitious board including: (a) a cementitious core; (b) a fibrous mat having an inner first surface facing at least one face of the cementitious core, and an outer second surface, wherein the inner first surface and the outer second surface are opposed; (c) a hydrophobic, non-setting coating resulting from applying to the outer second surface of the fibrous mat a layer of hydrophobic finish composition including: (i) about 50 to about 80 weight % non-setting, inorganic filler having a mean particle diameter of about 12 microns to about 35 microns, (ii) about 20% to about 50 weight % an aqueous dispersion of a film-forming polymer, (iii) 0% to about 30 weight % additional water; (iv) an absence of fly ash, (v) an absence of pozzolanic material, (vi) an absence of hydraulic cement, (vii) an absence of calcium sulfate hemihydrate, and (viii) an absence of calcium sulfate anhydrite.

19 Claims, 5 Drawing Sheets

(51) Int. Cl.
*B23B 27/20* (2006.01)
*C04B 28/04* (2006.01)
*C04B 28/14* (2006.01)
*B32B 27/20* (2006.01)
*C04B 111/00* (2006.01)

(52) U.S. Cl.
CPC ........ *C04B 28/14* (2013.01); *B32B 2262/101* (2013.01); *B32B 2419/04* (2013.01); *C04B 2111/0062* (2013.01); *C04B 2111/00379* (2013.01)

(56) References Cited

U.S. PATENT DOCUMENTS

| | | | |
|---|---|---|---|
| 4,835,195 A * | 5/1989 | Rayfield | C08K 3/26 523/220 |
| 4,916,004 A | 4/1990 | Ensminger et al. | |
| 5,397,631 A | 3/1995 | Green et al. | |
| 5,643,510 A | 7/1997 | Sucech | |
| 5,683,635 A | 11/1997 | Sucech et al. | |
| 5,714,001 A | 2/1998 | Savoly et al. | |
| 5,772,846 A | 6/1998 | Jaffee | |
| 6,342,284 B1 | 1/2002 | Yu et al. | |
| 6,632,550 B1 | 10/2003 | Yu et al. | |
| 6,770,354 B2 | 8/2004 | Randall et al. | |
| 6,774,146 B2 | 8/2004 | Savoly et al. | |
| 6,800,131 B2 | 10/2004 | Yu et al. | |
| 6,808,793 B2 | 10/2004 | Randall et al. | |
| 7,138,346 B2 | 11/2006 | Bush et al. | |
| 7,429,544 B2 | 9/2008 | Grove et al. | |
| 7,553,780 B2 * | 6/2009 | Smith | B32B 13/14 442/131 |
| 7,635,657 B2 | 12/2009 | Bland et al. | |
| 7,645,490 B2 | 1/2010 | Bush et al. | |
| 7,662,258 B2 | 2/2010 | Nandi et al. | |
| 7,691,761 B2 | 4/2010 | Nandi et al. | |
| 7,745,357 B2 | 6/2010 | Smith et al. | |
| 7,749,928 B2 | 7/2010 | Smith et al. | |
| 7,807,592 B2 | 10/2010 | Bland et al. | |
| 7,842,629 B2 | 11/2010 | Jaffee | |
| 7,867,927 B2 | 1/2011 | Bush et al. | |
| 7,932,195 B2 | 4/2011 | Smith et al. | |
| 7,964,061 B2 | 6/2011 | Nandi et al. | |
| 7,989,370 B2 | 8/2011 | Currier et al. | |
| 8,034,416 B2 | 10/2011 | Dupre, Jr. et al. | |
| 8,039,058 B2 | 10/2011 | Grove et al. | |
| 8,053,528 B2 | 11/2011 | Shoemake | |
| 8,084,378 B2 | 12/2011 | Jaffee et al. | |
| 8,092,858 B2 | 1/2012 | Smith | |
| 8,128,767 B2 | 3/2012 | Jaffee | |
| 8,193,107 B2 | 6/2012 | Tutin et al. | |
| 8,257,554 B2 | 9/2012 | Poggi et al. | |
| 8,461,067 B2 | 6/2013 | Smith et al. | |
| 8,535,790 B2 | 9/2013 | Dupre, Jr. et al. | |
| 8,568,544 B2 | 10/2013 | Engbrecht et al. | |
| 8,592,040 B2 | 11/2013 | Hayes et al. | |
| 8,703,628 B2 | 4/2014 | Tutin et al. | |
| 9,739,059 B2 | 8/2017 | Thomas et al. | |
| 2002/0045074 A1 | 4/2002 | Yu et al. | |
| 2003/0175478 A1 | 9/2003 | Leclercq | |
| 2004/0142618 A1 | 7/2004 | Porter | |
| 2004/0231916 A1 | 11/2004 | Englert et al. | |
| 2005/0009428 A1 * | 1/2005 | Porter | B32B 37/24 442/129 |
| 2005/0019618 A1 | 1/2005 | Yu et al. | |
| 2005/0215452 A1 | 9/2005 | Ruland et al. | |
| 2006/0035112 A1 | 2/2006 | Veeramasuneni et al. | |
| 2006/0068186 A1 * | 3/2006 | Leclercq | B32B 5/022 428/294.7 |
| 2007/0022913 A1 | 2/2007 | Wang et al. | |
| 2007/0042657 A1 | 2/2007 | Bush et al. | |
| 2008/0003903 A1 | 1/2008 | Nandi | |
| 2008/0176050 A1 | 7/2008 | Lintz et al. | |
| 2008/0245012 A1 * | 10/2008 | Boisvert | E04C 2/043 428/312.4 |
| 2009/0011207 A1 * | 1/2009 | Dubey | C04B 20/1051 428/219 |
| 2009/0084514 A1 | 4/2009 | Smith et al. | |
| 2009/0208714 A1 | 8/2009 | Currier et al. | |
| 2010/0087114 A1 | 4/2010 | Bush et al. | |
| 2012/0148806 A1 | 6/2012 | Dubey et al. | |
| 2014/0261954 A1 | 9/2014 | Dubey et al. | |
| 2014/0272404 A1 | 9/2014 | Shake et al. | |
| 2016/0222656 A1 * | 8/2016 | Teng | C03C 25/00 |
| 2016/0264461 A1 * | 9/2016 | Peng | C04B 41/4501 |

OTHER PUBLICATIONS

Aquamac (https://coatings.specialchem.com/product/r-polynt-aquamac-541, page visited on Sep. 22, 2020) in view of Peng et al. (PG Pub. 2016/0264461). (Year: 2020).*

RHOPLEX™ 2019RX, Dow, Construction Chemicals, URL: <www.dowconstructionchemicals.com/na/en/products/erc/styrene/2019rx.htm>, Dec. 13, 2017, pp. 1-2.

RHOPLEX™ 2019RX, Styrenated Acrylic Polymer, Dow, Technical Data Sheet, ® ™ Trademark of The Dow Chemical Company ("Dow") or an affiliated company of Dow RHOPLEX™ 2019RX / Dow Construction Chemicals, Form No. 832-00106-0710P&M, Jul. 2010.

Styrene Acrylic, Dow, Construction Chemicals, URL: <www.dowconstructionchemicals.com/na/en/markets/erc/styrene/>, Dec. 13, 2017, pp. 1-2.

USG DUROCK™ Brand Glass-Mat Tile Backerboard, USG Tile & Flooring Solutions, Submittal Sheet, Retrieved Dec. 13, 2017.

USG Fiberock Brand Tile Backerboard and Underlayment, Usg Tile & Flooring Solutions, Submittal Sheet, Retrieved Dec. 13, 2017.

JM® SECUROCK® Glass Mat Roof Board, Glass Mat Reinforced Cover Board, Johns Manville, www.jm.com/roofing, RS-5041, 8-16 (Replaces 10-14), Retrieved Dec. 13, 2017.

International Search Report and Written Opinion dated Sep. 18, 2019 for PCT/US2019/028828 to United States Gypsum Company filed Apr. 24, 2019.

* cited by examiner

FLY ASH-FREE COATING FORMULATION FOR FIBROUS MAT TILE BACKERBOARD

FIELD OF THE INVENTION

This invention relates generally to novel hydrophobic, non-setting finish that is fly ash-free for improving water resistance in cementitious product, such as mat-faced board. Such hydrophobic, non-setting finish coatings may be prepared and applied in batch, thereby improving consistency and decreasing maintenance and delay times.

BACKGROUND OF THE INVENTION

In construction applications it is important to protect building components from water intrusion and moisture related damage. Cementitious articles, such as gypsum board and cement board, are useful in a variety of applications, some of which require a degree of water resistance. Thus, for such applications, it is often desirable to use a cementitious article faced with a glass or polymer-based fiber mat instead of paper. It also is advantageous to use additives in the cementitious core that improve the water resistance of the core material itself. However, to improve water resistance the mat-faced gypsum board or cement board comprising, consisting of, or consisting essentially of gypsum-based core and fibrous mat is provided with a coating of hydrophobic finish. The fiber mat has an inner surface facing at least one face of the gypsum-based core and an outer surface opposite the inner surface. The hydrophobic finish faces the outer surface of the mat.

US Patent Application Publication No. 2012/0148806 to Dubey and Peng discloses a cementitious board system which is reinforced on its opposed surfaces by a glass fiber mesh scrim. For example, the major components of the hydrophobic finish are Portland cement and Class C fly ash to promote bonding of finish materials, film-forming polymer and preferably silane compound for water resistance.

US Patent Application Publication No. 2009/0011207 to Dubey discloses a fast setting lightweight cementitious composition for construction of cement board or panels. The cementitious composition includes 35-60 wt % cementitious reactive powder (also termed Portland cement-based binder), 2-10 wt % expanded and chemically coated perlite filler, 20-40 wt % water, entrained air, for example 10-50 vol %, on a wet (water included) basis, entrained air, and optional additives such as water reducing agents, chemical set-accelerators, and chemical set-retarders. These compositions optionally contain 0-25 wt % secondary fillers, for example 10-25 wt % secondary fillers. Typical filler includes one or more of expanded clay, shale aggregate, and pumice. The cementitious reactive powder used is typically either pure Portland cement or a mixture of Portland cement and a suitable pozzolanic material such as fly ash or blast furnace slag. The cementitious reactive powder optionally contains one or more of gypsum (land plaster) and high alumina cement (HAC) added in small dosages to influence setting and hydration characteristics of the binder.

Other methods of manufacture of cement boards are disclosed in U.S. Pat. No. 4,203,788 to Clear, which discloses a method and apparatus for producing fabric reinforced tile backerboard panel.

U.S. Pat. No. 4,488,909 to Galer et al. describes in further detail, in column 4, a cementitious composition used in a cementitious backerboard.

U.S. Pat. No. 4,504,335 to Galer discloses a modified method for producing a fabric reinforced cementitious backerboard.

U.S. Pat. No. 4,916,004 to Ensminger et al. describes a reinforced cementitious panel in which the reinforcement wraps the edges and is embedded in the core mix.

US Patent Application Publication No. 2014/0261954 to Dubey et al discusses the process of applying fly ash-based coating.

US Patent Application Publication No. 2016/0264461 to Peng et al discloses hydrophobic finish compositions and cementitious articles made with the hydrophobic finish compositions. In some embodiments, the article is a mat-faced cementitious board comprising: a cementitious core having a waterproof panel surface reinforced with inorganic mineral fibers. These waterproof panels have many uses, such as, tile backerboard in wet or dry areas of buildings, exterior weather barrier panel for use as exterior sheathing, interior wall and ceiling, and roof cover board having water durability and low surface absorption. The hydrophobic cementitious finish includes fly ash, film-forming polymer, preferably silane compound (e.g., alkyl alkoxysilane), an extended flow time retention agent including either one or more carboxylic acids, salts of carboxylic acids, or mixtures thereof, and other optional additives, for example defoaming agents. Preferably the non-woven glass fiber mat is pre-coated. The cementitious core on a dry basis may be gypsum-based, Portland cement-based, or based on another cement. The film-forming polymer of the hydrophobic finish composition is acrylic polymers and copolymers, styrene-butadiene rubber copolymers, copolymers of styrene and acrylic, copolymers of vinyl acetate and ethylene, copolymers of vinyl chloride and ethylene, copolymers of vinyl acetate and vinyl ester of versatic acid, copolymers of vinyl laurate and ethylene, terpolymers of vinyl acetate, ethylene and methylmethacrylate, terpolymers of vinyl acetate, ethylene and vinyl laurate, terpolymers of vinyl acetate, ethylene and vinyl ester of versatic acid, and any combination thereof, wherein the film-forming polymer is in an amount from about 5% to about 25% by weight of the wet finish. Thus, to achieve the resistance or tolerance to high humidity and high moisture environments, a hydrophobic coating is used on one side of the cementitious board, which yields a tile backerboard. Hydrophobic coatings in US Patent Application Publication No. 2016/0264461 to Peng et al use fly ash as filler. Because fly ash is a pozzolanic material that sets, the coating formulation requires continuous mixing which is associated with high maintenance, high delay, and low consistency.

There is a need for coatings that do not include fly ash or other setting compositions.

SUMMARY OF THE INVENTION

This invention relates generally to novel non-setting, hydrophobic finish for making hydrophobic, non-setting coatings for improving water resistance in cementitious product, such as mat-faced board. Such hydrophobic, non-setting coatings may be prepared and applied in batches, which improves consistency and decreases maintenance and delay times.

The non-setting, hydrophobic finish can be used as a coating in cement board or gypsum board products, for example, for tile backerboard. Because the hydrophobic finish is free of fly ash, the inventive coating dries and does not set. Accordingly, the inventive coating can be made in batches, which improve coating consistency in the related products and decreases maintenance and delay times associated with producing the related products.

The fly ash-free, non-setting, hydrophobic finish comprising, consisting of, or consisting essentially of (1) a non-setting, inorganic filler having a mean particle diameter of about 12 microns to about 35 microns, (2) an aqueous dispersion of film-forming polymer, and (3) optionally additional water and/or additives. Preferably, the non-setting, inorganic filler in an amount from about 50% to about 80% by weight of the finish composition on a water inclusive basis. Preferably, the aqueous dispersion of film-forming polymer has about 20 to about 60% solids, more preferably about 40 to about 60% solids, and is in an amount from about 20% to about 50% by weight of the finish composition on a water inclusive basis. Preferably, the additional water is in an amount from about 0% to about 30% by weight of the finish composition on a water inclusive basis. A mean particle diameter is the average particle diameter. Mean is a calculated value similar to the concept of average. The various mean calculations are defined in several standard documents. There are multiple definitions for mean because the mean value is associated with the basis of the distribution calculation (number, surface, volume). The present mean particle diameter is a number mean. In contrast, a median particle diameter is the middlemost particle diameter, larger than 50% of the diameter in the distribution and smaller than the other 50%. Median values are defined as the value where half of the population resides above this point, and half resides below this point. For particle size distributions the median is called the D50 (or ×50 when following certain ISO guidelines). The D50 is the size in microns that splits the distribution with half above and half below this diameter.

More specifically, a mat-faced cementitious board comprises:
(a) a cementitious core;
(b) a fibrous mat having an inner first surface facing at least one face of the cementitious core and an outer second surface, wherein the inner first surface and the outer second surface are opposed;
(c) a hydrophobic, non-setting coating resulting from applying to the outer second surface of the fibrous mat a layer of hydrophobic finish composition comprising:
   (i) about 50% to about 80% by weight a non-setting, inorganic filler having a mean particle diameter of about 12 microns to about 35 microns,
   (ii) about 20% to about 50% by weight an aqueous dispersion of a film-forming polymer,
   (iii) 0% to about 30% by weight additional water;
   (iv) an absence of fly ash,
   (v) an absence of pozzolanic material,
   (vi) an absence of hydraulic cement,
   (vii) an absence of calcium sulfate hemihydrate, and
   (viii) an absence of calcium sulfate anhydrite; and
wherein the hydrophobic surface coating adheres to the outer second surface of the fibrous mat and the cementitious core adheres to the opposed inner first surface of the fibrous mat.

The foregoing fibrous mat can comprise:
(1) a fibrous mat substrate having non-woven glass fibers, and
(2) a binder pre-coating comprising polymer binder and inorganic filler (setting or non-setting), wherein the binder pre-coating uniformly penetrates the fibrous mat substrate from the outer second surface of the fibrous mat to a depth which is a fraction of the thickness of the fibrous mat, the binder pre-coating is present in an amount of about 40 pounds per 1000 square feet (lbs/MSF) to about 165 lbs/MSF of the fibrous mat, wherein penetration of the binder pre-coating into the mat thickness is 10 percent to 75 percent of the mat thickness, and wherein the inorganic filler is selected from at least one member of the group consisting of inorganic pigment and inorganic binder; and
wherein the hydrophobic, non-setting coating is adjacent the binder pre-coating.

Typically penetration of the hydrophobic coating into the mat thickness is 10 to 50 percent of the mat thickness on pre-coated mats employed in the present invention.

The foregoing fibrous mat can comprise:
a fibrous mat substrate having non-woven glass fibers, wherein penetration of the hydrophobic coating into the mat thickness is 40 percent to 80 percent, preferably 60 to 80 percent, of the mat thickness, and wherein the inorganic filler is selected from at least one member of the group consisting of inorganic pigment and inorganic binder; wherein the fibrous mat substrate is not pre-coated, and wherein the hydrophobic coating is directly on the non-woven glass fibers.

Typically penetration of the hydrophobic coating into the mat thickness is 40 percent to 80 percent, preferably 60 to 80 percent of the mat thickness on non pre-coated mats employed in the present invention.

If desired, either of the foregoing may further include that the fibrous mat is a first fibrous mat, wherein the hydrophobic, non-setting coating is a first hydrophobic, non-setting coating, and wherein the mat-faced cementitious board further comprises:
(d) a second fibrous mat having an inner first surface facing at least one face of the cementitious core and an outer second surface, wherein the inner first surface and the outer second surface of the second fibrous mat are facing opposing faces of the cementitious core;
(e) a second hydrophobic, non-setting coating resulting from applying to the outer second surface of the second fibrous mat a layer of the hydrophobic finish composition; and
wherein the second hydrophobic surface coating adheres to the outer second surface of the second fibrous mat and a surface of the cementitious core opposed to the first fibrous mat adheres to the opposed inner first surface of the second fibrous mat.

A method of producing any one of the foregoing mat-faced cementitious boards, for example, can comprise:
(a) preparing a board comprising a fibrous mat having an inner first surface facing at least one face of the cementitious core and an outer second surface, wherein the inner first surface and the outer second surface are opposed;
(b) applying a hydrophobic finish to the outer second surface of the fibrous mat; and
(c) drying the hydrophobic finish to produce a hydrophobic, non-setting coating to form the mat-faced cementitious board.

Other advantages, benefits and aspects of the invention are discussed below, are illustrated in the accompanying figures, and will be understood by those of skill in the art from the more detailed disclosure below. All percentages, ratios and proportions herein are by weight, unless otherwise specified.

As used in the present specification at the very least, and not as an attempt to limit the application of the doctrine of equivalents to the scope of the claim, each numerical parameter modified by the term "about" should at least be con-

DETAILED DESCRIPTION OF THE INVENTION

Figure 1:
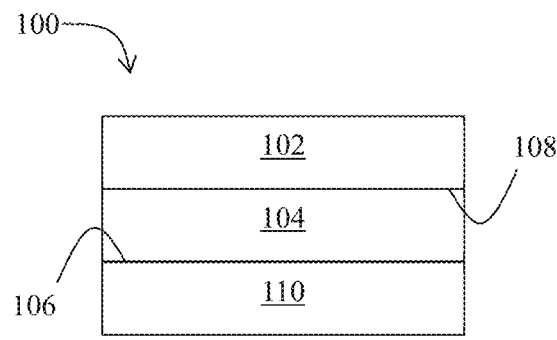
FIG. 1 illustrates a first exemplary product comprising a non-setting, hydrophobic finish of the present invention.

All percentages and ratios used herein, unless otherwise specified, are by weight (i.e., wt %) unless otherwise indicated.

The present invention provides a non-setting, hydrophobic finish comprising, consisting of, or consisting essentially of (1) a non-setting, inorganic filler having a mean particle diameter of about 12 microns to about 35 microns, (2) an aqueous dispersion of film-forming polymer, and (3) optionally additional water and/or additives. Preferably, the non-setting, inorganic filler is in an amount from about 50% to about 80% by weight of the finish composition on a water inclusive basis.

Non-Setting, Hydrophobic Finish

The present invention is directed, at least in part, to improving water resistance in cementitious product, such as mat-faced board. Product according to the invention comprises, consists of, or consists essentially of cementitious core and the above-mentioned hydrophobic finish facing an outer surface of the cementitious core.

The non-setting, hydrophobic finish can be used as a coating in cement board or gypsum board products, for example, for tile backerboard. Because the hydrophobic finish is free of fly ash, pozzolanic material, and other hydraulic setting composition, the inventive coating dries and does not set. Accordingly, the inventive coating can be made in batches, which improve coating consistency in the related products and decreases maintenance and delay times associated with producing the related products.

The non-setting, hydrophobic finish comprising, consisting of, or consisting essentially of (1) a non-setting, inorganic filler having a mean particle diameter of about 12 microns to about 35 microns, (2) an aqueous dispersion of film-forming polymer, and (3) optionally additional water and/or additives. Preferably, the non-setting, inorganic filler is in an amount from about 50% to about 80% by weight of the finish composition on a water inclusive basis. Preferably, the aqueous dispersion of film-forming polymer has about 20 to about 60% solids, preferably about 40 to about 55% solids, typically about 40 to 50% solids, and is in an amount from about 20% to about 50% by weight of the finish composition on a water inclusive basis.

The non-setting, hydrophobic finish can be used as a coating in cement board or gypsum board products, for example, for tile backerboard.

TABLE 1 provides the composition of various non-setting, hydrophobic finish formulations of the present invention. In TABLE 1, any value of a parameter from any column may be used with any value for other parameters from the same or other columns. However, typically in TABLE 1, any value of a parameter from any column may be used with the values for other parameters from the same columns

TABLE 1

Coating (hydrophobic finish composition) formulation
wt % on a wet (water included) basis

| | Useable range | Preferred range | Most Preferred Range | Specific example |
|---|---|---|---|---|
| Non-setting, inorganic filler (mean particle diameter of about 12 microns to about 35 microns, preferably about 13 to about 25 microns, more preferably about 15 to about 25 microns and most preferably about 15 to about 20 microns) | 50-80 | 55-75 | 50-70 | 66 |
| Aqueous dispersion of film-forming polymer * | 20-50 | 20-45 | 25-40 | 32 |
| Additional Water | 0-30 | 0-20 | 0-10 | 2 |
| Fly ash | 0 | 0 | 0 | 0 |
| Pozzolanic material | 0 | 0 | 0 | 0 |
| Hydraulic cement | 0 | 0 | 0 | 0 |
| Calcium sulfate hemihydrate | 0 | 0 | 0 | 0 |
| Calcium sulfate anhydrite | 0 | 0 | 0 | 0 |
| Optional Additives | 0-10 | 0-5 | 0-2 | 0 |

* The aqueous dispersion of film-forming polymer comprises water and the film-forming polymer with about 20 to about 60% solids, preferably about 40 to about 60% solids, typically about 40 to about 50% solids.

The non-setting, hydrophobic finish can be applied at a weight between about 50 lbs/MSF and about 150 lbs/MSF, preferably about 75 lbs/MSF to about 125 lbs/MSF, and more preferably 90 lbs/MSF to 110 lbs/MSF.

The non-setting, hydrophobic finish after drying can have a thickness of about 200 microns to about 300 microns, and preferably 230 microns to 270 microns.

Non-Setting, Inorganic Filler

The non-setting, inorganic filler can be included in the hydrophobic finish of the present invention in an amount (on a wet basis of the total hydrophobic finish) of about 50 wt % to about 80 wt %, preferably about 55 wt % to about 75 wt %, more preferably about 50 wt % to about 70 wt %, for example 67 wt %.

Examples of non-setting, inorganic fillers include, but are not limited to, calcium carbonate, sand, mica, glass microspheres, non-pozzolanic perlite, coated perlite, talcs, hydrated alumina, and any combination thereof. Preferably the non-setting, inorganic filler comprises 50 wt % or more calcium carbonate by weight of the non-setting, inorganic filler, more preferably 75 wt % or more calcium carbonate by weight of the non-setting, inorganic filler, and most preferably 90 wt % or more calcium carbonate by weight of the non-setting, inorganic filler, including 100 wt % calcium carbonate by weight of the non-setting, inorganic filler.

Perlite is generally a non-setting, inorganic material. However, if ground finely, perlite can have pozzolanic properties. As used herein, the term "non-pozzolanic perlite" refers to perlite that does not have pozzalonic properties as defined in ASTM C618-97. The hydrophobic finish of the present invention has an absence of pozzolanic perlite. Optionally, the hydrophobic finish of the present invention can have an absence of non-pozzolanic perlite.

Ground limestone can be a suitable calcium carbonate suitable for use in the hydrophobic finish of the present invention. An exemplary commercially available calcium carbonate suitable for use in the hydrophobic finish of the present invention includes, but is not limited to, a calcium carbonate from the OMYACARB® product line (available from Omay AG), a calcium carbonate from the HUBERCRETE® product line (e.g., HUBERCRETE® M PRIME) (available from Huber Engineered Materials), and combinations thereof.

The non-setting, inorganic filler preferably comprises particles that are sized to mitigate settling (i.e., not too large) and to mitigate high viscosity (i.e., not too small). While the concentration of additives like dispersants and the composition of the non-setting, inorganic filler affect the particle settling and dispersion viscosity, preferably, the non-setting, inorganic filler can comprise particles having a mean particle diameter of about 12 microns to about 35 microns, preferably about 13 to about 25 microns, more preferably about 15 to about 25 microns and most preferably about 15 to about 20 microns.

Aqueous Dispersion of Film-Forming Polymer

The aqueous dispersion of film-forming polymer comprises water and the film-forming polymer with about 20 to about 60% solids, preferably about 40 to about 60% solids, typically about 40 to about 50% solids.

The film-forming polymer of the hydrophobic finish of the present invention is preferably made from a pure acrylic, a rubber, a styrene butadiene rubber, a styrene acrylic, a vinyl acrylic, or an acrylated ethylene vinyl acetate copolymer. Preferably film-forming polymer is derived from at least one acrylic monomer selected from the group consisting of acrylic acid, acrylic acid esters, methacrylic acid, and methacrylic acid esters. For example, the monomers preferably employed in emulsion polymerization include methyl acrylate, methyl methacrylate, ethyl acrylate, ethyl methacrylate, butyl acrylate, butyl methacrylate, propyl acrylate, propyl methylacrylate, 2-ethyl hexyl acrylate and methacrylate, cyclohexyl acrylate and methacrylate, decyl-acrylate and methacrylate, isodecylacrylate and methacrylate, benzyl acrylate and methacrylate, other acrylates, methacrylates and their blends, acrylic acid, methacrylic acid, styrene, vinyl toluene, vinyl acetate, vinyl esters of higher carboxylic acids than acetic acid, for example, vinyl versatate, acrylonitrile, acrylamide, butadiene, ethylene, vinyl chloride and the like, and mixtures thereof.

Typically, the film-forming polymer is water-soluble such as, for example, a latex polymer. The polymer can be used in either liquid form or as a re-dispersible polymer. One example a styrenated acrylic copolymer.

Preferably, the film-forming polymer comprises one or more of the following: acrylic polymers and copolymers, rubber-based polymers and copolymers such as styrene-butadiene rubber, copolymers of styrene and acrylic, copolymers of vinyl acetate and ethylene, copolymers of vinyl chloride and ethylene, copolymers of vinyl acetate and vinyl ester of versatic acid, copolymers of vinyl laurate and ethylene, terpolymers of vinyl acetate, ethylene and methyl methacrylate, terpolymers of vinyl acetate, ethylene and vinyl laurate, terpolymers of vinyl acetate, ethylene, and vinyl esters of branched tertiary monocarboxylic acids (e.g. vinyl ester of versatic acid or neo vinyl esters, of itaconic acid, crotonic acid, maleic acid, fumaric acid), and any combination thereof.

As used herein, "molecular weight" in reference to a polymer or any portion thereof, means to the weight-average molecular weight ("Mw") of the polymer or portion. In one embodiment, the polymers for use in the present invention exhibit a weight average molecular weight of greater than or equal to 10,000 grams per mole ("g/mole"). For example, in a range of 30,000 to 5,000,000 g/mole. More typically the polymer of the present invention exhibits a weight average molecular weight of from about 100,000 g/mole to about 2,500,000 g/mole, or more typically about 150,000 g/mole to about 1,000,000 g/mole.

Commonly used monomers are butyl acrylate, methyl methacrylate, ethyl acrylate and the like. Preferably, the monomers include one or more monomers selected from the group consisting of n-butyl acrylate, methyl methacrylate, styrene, and 2-ethylhexyl acrylate.

The film-forming polymer is preferably derived from at least one acrylic monomer selected from the group consisting of acrylic acid, acrylic acid esters, methacrylic acid, and methacrylic acid esters. For example, the film-forming polymer can be a butyl acrylate/methyl methacrylate copolymer or a 2-ethylhexyl acrylate/methyl methacrylate copolymer. For example, the film-forming polymer can be a butyl acrylate/methyl methacrylate copolymer or a 2-ethylhexyl acrylate/methyl methacrylate copolymer.

Typically, the film-forming polymer is further derived from one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4-C8 conjugated dienes such as 1,3-butadiene, isoprene or chloroprene. For example, the film-forming polymer can be a pure acrylic, a styrene acrylic, a vinyl acrylic, or an acrylated ethylene vinyl acetate copolymer.

The pure acrylics preferably comprise acrylic acid, methacrylic acid, an acrylate ester, and/or a methacrylate ester as the main monomers. The styrene acrylics preferably comprise styrene and acrylic acid, methacrylic acid, an acrylate ester, and/or a methacrylate ester as the main monomers. The vinyl acrylics preferably comprise vinyl acetate and acrylic acid, methacrylic acid, an acrylate ester, and/or a methacrylate ester as the main monomers. The acrylated ethylene vinyl acetate copolymers preferably comprise ethylene, vinyl acetate and acrylic acid, methacrylic acid, an acrylate ester, and/or a methacrylate ester as the main monomers. The monomers can also include other main monomers such as acrylamide and acrylonitrile, and one or more functional monomers such as itaconic acid and ureido methacrylate, as would be readily understood by those skilled in the art. In a particularly preferred embodiment, the film-forming polymer is a pure acrylic such as a butyl acrylate/methyl methacrylate copolymer derived from monomers including butyl acrylate and methyl methacrylate.

A typical film-forming polymer is comprised of one or more esters of acrylic or methacrylic acid, typically a mixture, for example, about 50/50 by weight, of a high Tg monomer (e.g. methyl methacrylate) and a low Tg monomer (e.g. butyl acrylate), with small proportions (e.g. about 0.5% to about 2% by weight) of acrylic or methacrylic acid. The vinyl-acrylic polymers for example include vinyl acetate and butyl acrylate and/or 2-ethyl hexyl acrylate and/or vinyl versatate. In a typical vinyl-acrylic polymer, at least 50% of the polymer formed is comprised of vinyl acetate, with the remainder being selected from the esters of acrylic or methacrylic acid. The styrene/acrylic polymers are typically similar to the acrylic polymers, with styrene substituted for all or a portion of the methacrylate monomer thereof.

Combinations of the foregoing polymers are suitable for use as the film-forming polymer.

The aqueous dispersion of film-forming polymer can be included in the hydrophobic finish of the present invention in an amount (on a wet basis of the total hydrophobic finish) of about 20 wt % to about 50 wt %, preferably about 25 wt % to about 45 wt %, more preferably about 30 wt % to about 40 wt %, for example 33 wt %.

Additional Water

Water, in addition to the water from other components (e.g., aqueous dispersion of film-forming polymer) of the hydrophobic finish, can be included in the hydrophobic finish of the present invention in an amount (on a wet basis of the total hydrophobic finish, when included) of about 0.01 wt % to about 30 wt %, preferably about 0.1 wt % to about 20 wt %, and more preferably about 0.1 wt % to about 10 wt %. In some embodiments, the hydrophobic finish (before application as a coating) can have an absence of additional water.

Additives

The hydrophobic finish of the present invention has an absence of hydraulic setting compositions. As used herein, the term "hydraulic setting composition" refers to a composition that when contacted with water initiates a hydration reaction and hardens. Examples of hydraulic setting compositions include, but are not limited to, fly ash, pozzolanic material, hydraulic cement, calcium sulfate hemihydrate, and calcium sulfate anhydrite.

Hydraulic cements for purposes of this invention is a cement that undergoes a chemical setting reaction when it comes in contact with water (hydration) and which will not only set (cure) under water but also forms a water-resistant product. Hydraulic cements include, but are not limited to, aluminum silicate cements like Portland cement, calcium sulfoaluminate cement, calcium aluminate-based cement, and calcium fluoroaluminate cements. The hydrophobic finish of the present invention has an absence of hydraulic cement.

As used herein, "Portland cement" is a calcium silicate based hydraulic cement. ASTM C 150 defines Portland cement as "hydraulic cement (cement that not only hardens by reacting with water but also forms a water-resistant product) produced by pulverizing clinkers consisting essentially of hydraulic calcium silicates, usually containing one or more of the forms of calcium sulfate as an inter ground addition." As used herein, "clinkers" are nodules (diameters, about 0.2 to about 1.0 inch [5-25 mm]) of a sintered material that are produced when a raw mixture of predetermined composition is heated to high temperature. The hydrophobic finish of the present invention has an absence of Portland cement.

ASTM C618-97 defines pozzolanic materials as "siliceous or siliceous and aluminous materials which in themselves possess little or no cementitious value, but will, in finely divided form and in the presence of moisture, chemically react with calcium hydroxide at ordinary temperatures to form compounds possessing cementitious properties." Pozzolanic materials include, but are not limited to, pozzolanic perlite, pumice, diatomaceous earth, montmorillonite clay, silica fume, tuff, trass, rice husk, metakaolin, shale, ground granulated blast furnace slag, fly ash, and any natural pozzolan like volcanic ash. The hydrophobic finish of the present invention has an absence of pozzolanic materials.

Thus, the hydrophobic finish of the present invention has an absence of fly ash.

Also, in view of the absence of pozzolanic materials from the hydrophobic finish of the present invention, the hydrophobic finish of the invention has an absence of pozzolanic perlite. However, perlite if rendered non-pozzolanic may be included in the hydrophobic finish of the invention. Typically the hydrophobic finish of the present invention has an absence of all perlite.

Ground granulated blast furnace slag can act as a pozzolanic material, a hydraulic cement, or both. Regardless of whether ground granulated blast furnace slag acts as a pozzolanic material, a hydraulic cement, or both, the hydrophobic finish of the present invention has an absence of blast furnace slag.

Because the hydrophobic finish of the present invention is a drying type and not a setting type, retarding agents are not necessarily needed. Typically the hydrophobic finish of the present invention preferably has an absence of a retarding agent. The hydrophobic finish of the present invention preferably has an absence of a retarding agent comprising at least one member of the group consisting of carboxylic acids (e.g., citric acid and gluconic acid), salts of carboxylic acids (e.g., sodium citrate and sodium gluconate), and mixtures thereof.

Optionally, water reducing admixture additives can be included in embodiments of the finish composition, such as, for example, superplasticizer, to improve the fluidity of the hydrophobic finish. Typical superplasticizers are selected from any of polycarboxylate ether (PCE) superplasticizers, sulfonated melamines, sulfonated naphthalenes, and any combination thereof. Such additives disperse the molecules in solution so that they move more easily relative to each other, thereby improving the flowability of the entire slurry. PCE superplasticizers, sulfonated melamines, and sulfonated naphthalenes disclosed as superplasticizers in US 20140272402 to Dubey et al. U.S. Pat. No. 7,776,462 to Liu et al. discloses examples of PCE superplasticizers.

Optionally, the water reducing additives can include polyacid hydrophobic copolymer dispersants. These copolymer dispersants are typically supplied in the neutralized from using either ammonium or alkali metal salts. For example, acrylic polymers, polycarboxylate, and sodium salt thereof, all provide dispersant efficiency and impart great water resistance.

The polymeric anionic dispersant, which is a polymer functionalized with more than one anionic group, promotes the formation of a stable aqueous dispersion of the pigment particles. As distinct from surfactants, polymeric anionic dispersants comprise a plurality of anionic groups, preferably at least 5 anionic groups per molecule. Consequently, surfactants lower air-water or oil-water surface tension whereas dispersants do not significantly lower surface tension.

Examples of suitable dispersants include salts of a) a homopolymer or a copolymer a carboxylic acid monomer; b) a copolymer of maleic anhydride and diisobutylene; c) a copolymer of styrene and maleic anhydride; d) carboxylmethyl cellulose; and e) a homopolymer or copolymer with a plurality of sulfate, sulfonate, phosphate, or phosphonate groups, or combinations thereof, attached to the polymer or copolymer backbone.

Suitable carboxylic acid monomers include acrylic acid, methacrylic acid, or itaconic acid, or a combination thereof as well as anhydrides of carboxylic acid monomers, such as methacrylic anhydride and maleic anhydride. Acrylic acid is a preferred carboxylic acid monomer. Examples of monomers suitable to form carboxylic acid functionalized copolymers include nonionic acrylate or methacrylates such as ethyl acrylate, butyl acrylate, methyl methacrylate, butyl methacrylate, 2-ethylhexyl acrylate, and benzyl methacrylate, and combinations thereof.

The weight average molecular weight ($M_w$) of the dispersant is typically in the range of from 2000 Daltons to 300,000 Daltons, more preferably to 200,000 Daltons as measured by size exclusion chromatography using polyacrylic acid standards ranging in molecular weight from 216 g/mol to 1,100,000 g/mol.

When present, the water reducing admixture additives can be included in the hydrophobic finish of the present invention in an amount (on a wet basis of the total hydrophobic finish) of about 0.05 wt. % to about 5 wt. %, preferably about 0.1 wt. % to about 2 wt. %, and more preferably about 0.1 wt. % to about 1 wt. %. In some instance, the hydrophobic finish of the present invention has an absence of water reducing admixture additives.

Colorants optionally can be added to the hydrophobic finish of the present invention to change the color of the composition or finished articles as desired. Any dyes or pigments that are compatible with the composition and non-setting may be optionally used. Titanium dioxide is optionally used as a whitener. A preferred colorant is AQUABLAK® (an activated carbon dispersion, available from Solution Dispersions). Pigments which may be used are all pigments known to a person skilled in the art for the intended use. Typical pigments for the aqueous formulations according to the invention are, for example, titanium dioxide, preferably in the form of rutile, barium sulfate, zinc oxide, zinc sulfide, basic lead carbonate, antimony trioxide and lithopone (zinc sulfide and barium sulfate). However, the aqueous formulations can also contain colored pigments, for example iron oxides, carbon black, graphite, luminescent pigments, zinc yellow, zinc green, ultramarine, manganese black, antimony black, manganese violet, Paris blue or Schweinfurt green. In addition to the inorganic pigments, the formulations according to the invention may also contain organic colored pigments, for example sepia, gamboge, Kasset brown, toluidine red, para red, Hansa yellow, indigo, azo dyes, anthraquinoid and indigoid dyes and dioxazine, quinacridone, phthalocyanine, isoindolinone and metal complex pigments.

When present, the colorants can be included in the hydrophobic finish of the present invention in an amount (on a wet basis of the total hydrophobic finish) of about 0.05 wt. % to about 2 wt. %, preferably about 0.1 wt. % to about 1 wt. %, and more preferably about 0.1 wt. % to about 0.5 wt. %. In some instance, the hydrophobic finish of the present invention has an absence of colorants.

Biocides optionally can be added to the hydrophobic finish of the present invention to mitigate bacteria growth in the wet hydrophobic finish. A preferred biocide include, but are not limited to, 2[(hydroxymethyl)amino]-2-methylpropanol; 3-iodo-2-propnynyl butyl carbamate; n-(3,4-dichlorophenyl)-n,n-dimethlyurea; 1,2 benzisothiazolin-3-one; and any combination thereof.

When present, the biocides can be included in the hydrophobic finish of the present invention in an amount (on a wet basis of the total hydrophobic finish) of about 0.05 wt % to about 0.5 wt %, and preferably about 0.1 wt % to about 0.25 wt %. In some instance, the hydrophobic finish of the present invention has an absence of biocides.

Mildewcides optionally can be added to the hydrophobic finish of the present invention to mitigate mildew formation on the dried hydrophobic finish coating. An example mildewcide is ZINC OMADINE™ ZOE™ (an antimicrobial available from Lonza).

When present, the mildewcides can be included in the hydrophobic finish of the present invention in an amount (on a wet basis of the total hydrophobic finish) of about 0.05 wt % to about 0.3 wt %, and preferably about 0.1 wt % to about 0.25 wt %. In some instance, the hydrophobic finish of the present invention has an absence of mildewcides.

Optionally, defoamers are used to reduce entrapped air bubbles in the process. Polymers can entrap air during transportation and mixing. Fillers such as calcium carbonate can have air between the particles. Liquid defoamers can be added to the hydrophobic finish of the present invention. A defoamer or an anti-foaming agent is a chemical additive that reduces and hinders the formation of foam in industrial process liquids. The additive is used to prevent formation of foam or is added to break a foam already formed. The terms anti-foaming agent and defoamer are often used interchangeably. Typical liquid defoamers are one or more of oil based, water based, silicone based, Ethylene Oxide/Propylene Oxide based, or alkyl polyacrylate based defoamers. For example, they may be alkoxylated alcohol, petroleum distillates, mixtures of paraffinic mineral oils and hydrophobic components, polysiloxanes and hydrophobic solids in polyglycol, and polydimethylsiloxanes, for example polydimethylsiloxane or polyether-modified polydimethylsiloxane. They can be used alone, or as a combination. Silicone-based defoamers are polymers with silicon backbones. The silicone compound consists of hydrophobic silica dispersed in a silicone oil. Commonly used defoaming agents are polydimethylsiloxanes, for example polydimethylsiloxane, and other silicones. Emulsifiers are added to ensure the silicone spreads fast and well in the foaming medium. The silicone compound might also contain silicone glycols and other modified silicone fluids. Another possible defoamer is a mixture of foam-destroying polysiloxanes and hydrophobic solids in polyglycol. However, there can be an absence of silicone-based defoamers.

Typical examples of such alkoxylated alcohol defoaming agents include propoxylates and butoxylates of aliphatic alcohols containing from 4 to 36 carbon atoms. Typically antifoaming agents include non-ionic surfactants having a 0-3 HLB Value. DE 3018173 relates to highly alkaline, storage stable, and low-foaming solid cleaning compositions comprising a branched C12-022 alcohol based detergent with 5-15 PO units. An especially preferred product was stated to be C16 Guerbet alcohol reacted with 10 moles of propylene oxide. US 2005/0215452 relates to the use of a C10 alkanol alkoxylate mixture as emulsifier, foam regulator and wetting agent. Specifically 2-propylheptanol propoxylates with up to 1.71 PO are disclosed, though products including both PO and EO units are preferred.

When present, the defoamers can be included in the hydrophobic finish of the present invention in the amount (on a wet basis of the total hydrophobic finish) of about 0.05 wt. % to about 2 wt. %, preferably about 0.1 wt. % to 1.5 wt. %, more preferably about 0.2 wt. % to about 1 wt. %. Typically, when present, the defoamer dosage can be in an amount (on a wet basis of the total hydrophobic finish) of 0-1% by weight of the total coating weight, preferably 0.1-1% by weight of the total coating weight, more preferably 0.2-0.8% by weight of the total coating weight. The hydrophobic finish of the present invention may have an absence of silicone based defoamers. The hydrophobic finish of the present invention may have an absence of defoamers.

Product Structure

In some embodiments, product is board that comprises, consists of, or consists essentially of cementitious core (e.g., gypsum-based core), fibrous mat, and non-setting, hydrophobic finish that faces an outer surface of the mat, where the mat has an inner surface that can face a gypsum core, and the outer surface is opposite the inner face.

FIG. 1 illustrates a first exemplary product 100 comprising a non-setting, hydrophobic finish 102 of the present invention. The exemplary product 100 comprises a fibrous mat substrate 104 having two opposing surfaces (an inner first surface 106 and an outer second surface 108), a cementitious core 110 facing an inner first surface 106 of the fibrous mat substrate 104, and a coating of the non-setting, hydrophobic finish 102 on an outer second surface 108 of the fibrous mat substrate 104. In alternative embodiments (not illustrated), another layering of a fibrous mat substrate 104 and then the non-setting, hydrophobic finish may be on an opposite surface of the cementitious core 110. This has an absence of a binder pre-coating on an outer second surface of the fibrous mat substrate 104.

Figure 2:
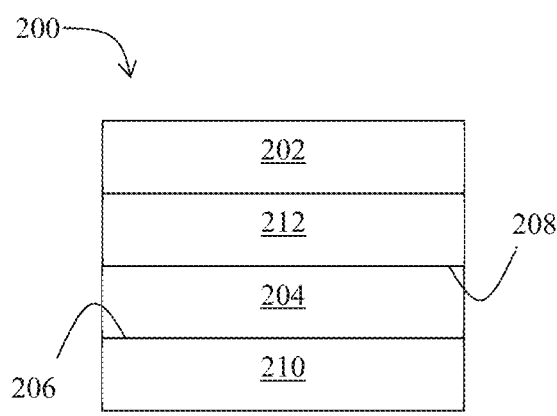
FIG. 2 illustrates a second exemplary product comprising a non-setting, hydrophobic finish of the present invention.

FIG. 2 illustrates a second exemplary product 200 comprising a non-setting, hydrophobic finish 202 of the present invention. The exemplary product 200 comprises a fibrous mat substrate 204 having two surfaces (an inner first surface 206 and an outer second surface 208) with a binder pre-coating 212 on an outer second surface 208 of the fibrous mat substrate 204, a cementitious core 210 facing an inner first surface 206 of the fibrous mat substrate 204, and a coating of the non-setting, hydrophobic finish 202 on the binder pre-coating 212.

Figure 3:
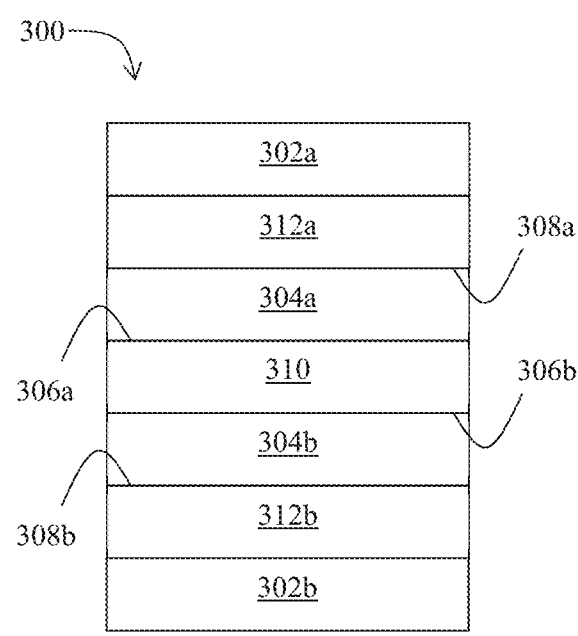
FIG. 3 illustrates a third exemplary product comprising a non-setting, hydrophobic finish of the present invention.

FIG. 3 illustrates a third exemplary product 300 comprising a non-setting, hydrophobic finish 302 of the present invention. The exemplary product 300 is a sandwich structure, where on either surface of a cementitious core 310 is one of the two fibrous mat substrate 304a, 304b each having a corresponding inner first surface 306a, 306b facing the cementitious core 310. The outer second surface 308a, 308b of each fibrous mat substrate 304a, 304b has a corresponding binder pre-coating 312a, 312b. The coating of the non-setting, hydrophobic finish 302a, 302b is on the corresponding binder pre-coating 312a, 312b.

The foregoing product structures are exemplary and non-limiting. Other structures are envisioned include, but not limited to a product structure similar to FIG. 3 where only one of the fibrous mat substrates has a binder pre-coating.

As illustrated, when a fibrous mat substrate with a binder pre-coating is used, the non-setting, hydrophobic finish of the present invention is preferably applied to the pre-coated surface of the coated fibrous mat rather than the raw fiber side. The cementitious-based core is adhered to the raw fiber side.

The non-setting, hydrophobic finish improves water resistance, which is desired for wet area applications. Water resistance is measured by the surface water absorption. The surface water absorption of the product can be less than 1.5 grams, preferably less than 1.0 grams, and more preferably less than 0.5 grams. The surface water absorption of the product can be determined using the Cobb method with a cylinder of $100\pm0.2$ cm$^2$ inside diameter and 2.54 cm (1 inch) in height, where the product surface is exposed to water in the cylinder for 2 hours. The weight after exposure minus the weight before exposure is the surface water absorption.

Methods of Making

Figure 4A:
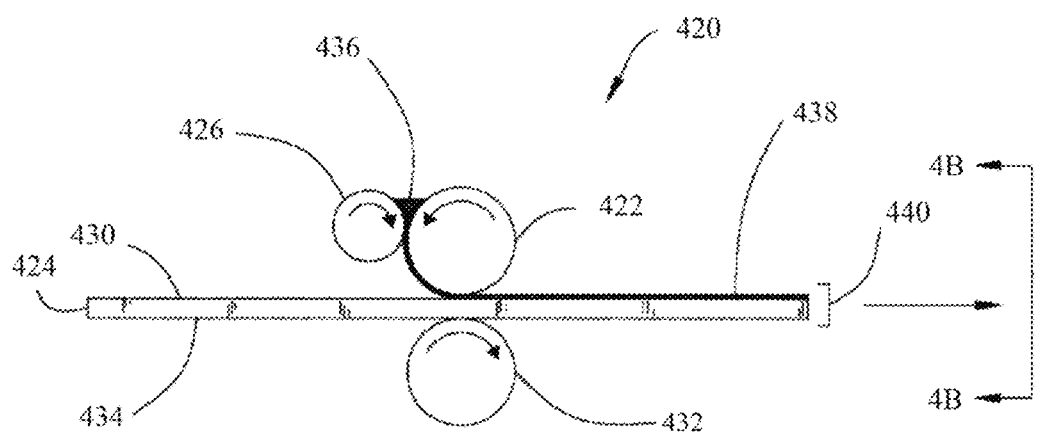
FIG. 4A is a schematic side view illustrating a roller assembly comprising a finish roller with circumferential grooves defined therein applying a non-setting, hydrophobic finish to a mat-faced cementitious board with the assembly in a direct finish orientation, in accordance with embodiments of the invention.

FIG. 4A shows a schematic side view illustrating a roller assembly for making a composite board of the present invention comprising a finish roller with circumferential grooves defined therein applying a hydrophobic finish composition to a mat faced cementitious board with the assembly in a direct finish orientation, in accordance with an embodiment of the invention.

Figure 4B:
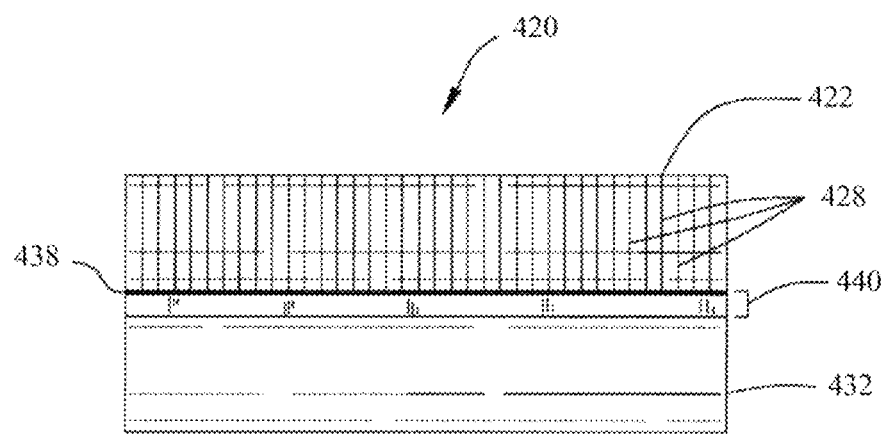
FIG. 4B is a front schematic view of the roller assembly taken along the line 4B-4B depicted in FIG. 4A.

One exemplary apparatus for applying finish composition to a mat-faced board (e.g., gypsum board) is depicted in FIGS. 4A-4B, which show a direct application orientation of a roller assembly 420 such that a finish roller 422 rotates in the same direction that the mat-faced board 424 travels as described below. Thus, the finish roller 422 rotates in a direction so its surface moves in the same direction as the board moves. In contrast, in reverse finishing configurations, described below in connection with FIGS. 5A-5B, the finish roller rotates in reverse so its surface in contact with the board is moving in the opposite direction that the board moves.

FIG. 4A shows roller assembly 420 also includes a doctor roller 426 which engages finish roller 422. Rollers 422 and 426 are mounted with brackets journaled to allow for rotation and extend from columns mounted on the building floor or table on which the board travels. One or both of the rollers 422 and 426 are driven by a motor. In some embodiments, the finish roller 422 and doctor roller 426 are driven, for example, by independent, variable speed, drive assemblies. This can be advantageous in some embodiments to allow the finish roller 422 speed and doctor roller 426 speeds to be varied independently, as desired. In other embodiments, one of the rollers 422 or 426 is driven while the other roller 422 or 426 is an idler such that it rotates by engagement with the driven roller to rotate in response to the roller being driven.

The doctor roller 426 engages with the finish roller 422. Particularly, the doctor roller 426 mates with the finish roller 422 to form a trough between the two, where the finish composition is introduced. The finish roller 422 and the doctor roller 426 generally counter-rotate (i.e., rotate in opposite directions relative to one another) both in direct finishing or reverse finishing configurations (described below). Having the finish roller 422 and doctor roller 426 engage in this manner facilitates keeping the slurry for the hydrophobic, non-setting coating in the gap between the two rollers so that the slurry for the hydrophobic, non-setting coating does not spill. The position of the doctor roller 426 is adjusted relative to the finish roller 422. This may result in a small gap between the two rollers, which can be adjusted to control the amount of slurry allowed to pass between them, which in turn influences the amount of finishing composition to be applied. If desired, particularly in direct finishing arrangement, this gap may actually be negative indicating an interference fit as that term is understood in the art, thereby indicating that the doctor roller 426 is touching, and compressing the surface of, the finish roller 422.

FIG. 4B shows the finish roller 422 includes grooves 428 circumferentially disposed in the surface of the finish roller 422. In the direct application orientation, doctor roller 426 is upstream of finish roller 422 to minimize the surface area of finish roller 422 bearing the finish composition. In this respect, it has been found that increasing the surface area (beyond, for example, 90 degree, 100 degree, 120 degree, etc.) of the portion of finish roller 422 that bears finish composition increasingly results in undesirable variation in the finish application. A top surface 430 of the board 424 as shown is adjacent to the finish roller 422. A bottom roller 432 is disposed under a bottom surface 434 of the board 424. The board is generally supported by a roller conveyor, chain conveyor, belt conveyor, or the like at the pass line height (i.e., the same elevation as the top of the bottom roller 432). For example, the bottom roller 432 can optionally work in concert with other rollers which help transport board into and out of the assembly roller 420.

Hydrophobic finish composition is dispensed between finish roller 422 and doctor roller 426 to feed the composition between the finish roller 422 and doctor roller 426 and onto the surface of the finish roller 422 for application to top surface 430 of board 424. A head 436 of the hydrophobic finish composition slurry forms between the doctor roller 426 and the finish roller 422. The head can be controlled by a sensor such as laser control as understood in the art. The surface of the finish roller 422 pulls finish composition onto the board 424 to deposit the finish composition onto the top surface 118 to lay a finish 438 and form a composite 440. The bottom roller 432 provides underlying support and is generally aligned under the finish roller 422.

Figure 5A:
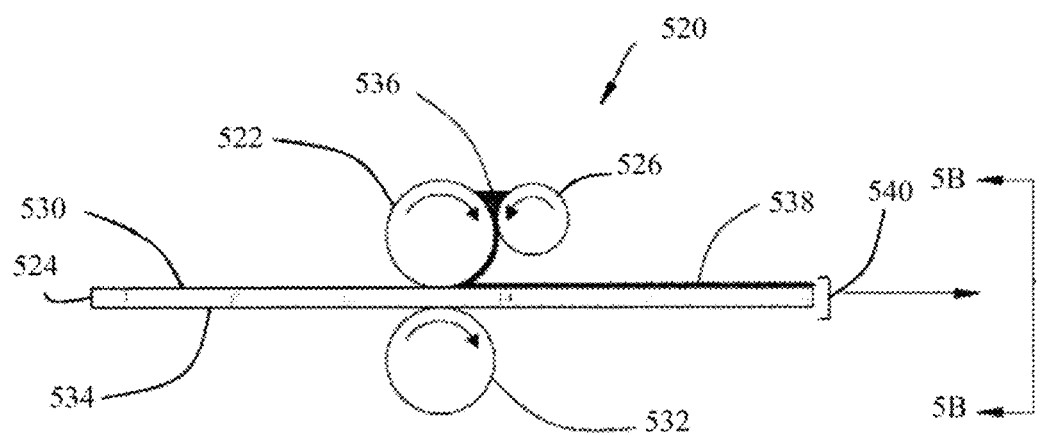
FIG. 5A is a schematic side view illustrating a roller assembly comprising a finish roller with circumferential grooves defined therein applying a non-setting, hydrophobic finish to a mat-faced cementitious board with the assembly in a reverse finish orientation, in accordance with embodiments of the invention.
Figure 5B:
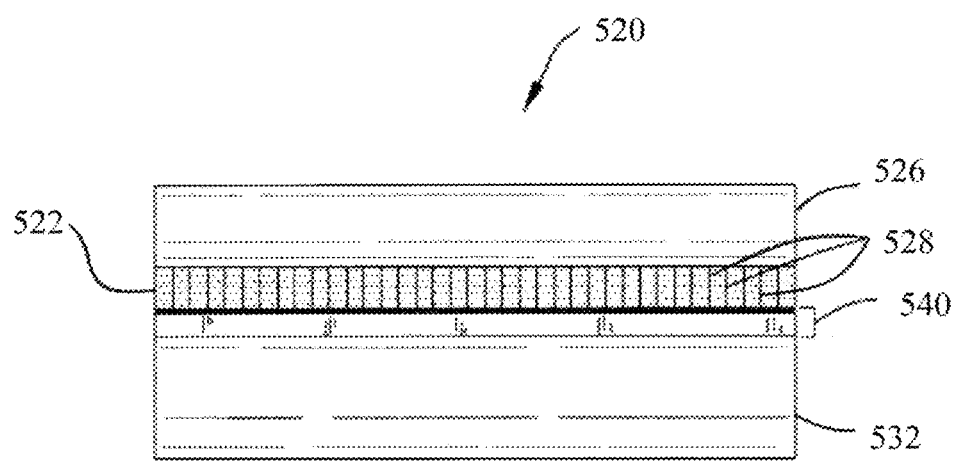
FIG. 5B is a front schematic view of the roller assembly taken alone the line 5B-5B depicted in FIG. 5A.

FIGS. 5A-5B depict another exemplary apparatus for applying a finish composition to a mat-faced board (e.g., gypsum board). This shows a reverse application orientation of a roller assembly 520 such that a finish roller 522 rotates in the opposite or counter direction that the mat-faced board 212 travels. Roller assembly 520 includes a doctor roller 526 which engages with finish roller 522 in counter-rotation. As best seen in FIG. 5B, the finish roller 526 includes grooves 528 circumferentially disposed in the surface of the roller 522. In the reverse application orientation, doctor roller 526 is downstream of finish roller 522 to minimize the surface area of the finish roller 526 that bears the finish composition. A top surface 530 of the board 524 as shown is adjacent to the finish roller 526. A bottom roller 532 is disposed under a bottom surface 534 of the board 524. The bottom roller 532 may have a cover formed from, for example, rubber or elastomeric material such as neoprene, to achieve traction on the bottom surface 534, to ensure board travels at the desired speed and desired direction, despite the frictional force of the finish roll 522.

Finish composition is dispensed between finish roller 522 and doctor roller 526. A head 536 of the hydrophobic finish composition slurry forms between the doctor roller 526 and the finish roller 522. The finish roller 522 acts to apply the finish composition onto the top surface 530 to lay a finish 538 and form a composite 540. Other aspects of the embodiment set forth in FIGS. 5A-5B, such as driver for the roll, the mounting thereof, and the presence of other bottom rollers, are similar to the description set forth relative to FIGS. 4A-4B as described above.

Generally, in the apparatus shown in FIGS. 4A and 4B as well as the apparatus shown in FIGS. 5A, and 5B, doctor roller 426 or 526 has a smaller diameter than finish roller 422 or 522. This is because the highest elevation of both the doctor roller 426 and finish roller 422 typically is at the same elevation (or with axes at substantially coinciding elevation), and the lowest elevation of the doctor roller 426 or 526 should be higher than the surface to be finished, to avoid interference with the article being finished. The grooves 428 and 528 can be in any suitable configuration. For example, the finish roller 422 or 522 can comprise a buttress thread form to define the grooves in some embodiments. In embodiments including the buttress thread configuration, any suitable buttress thread count per longitudinal inch of the roller can be used.

In these apparatus, each roller piece in the roller assembly can be independently driven and varied to allow fine tuning of the finishing. As noted herein, the bottom roller can optionally be a part of a larger section of rollers used in conveyors for moving board down a manufacturing line. For example, if desired, a series of rollers can be driven with one drive and linked together (e.g., with chains, belts, or the like). However, in some embodiments, the bottom roller can have its speed independently varied relative to other conveying rollers to thereby allow more precise control of the bottom roller of the roller assembly of embodiments of the invention (e.g., to regulate the speed of the bottom roller to correspond with the speed of the board).

The bottom roller is a supporting roller opposing the finish roller. For example, the finish roller advantageously can keep the board being treated with finish composition at the desired elevation (path line height) while also enhancing traction to drive the board in the proper direction at a substantially constant rate down the manufacturing line. The bottom roller further facilitates having an even finish thickness on the outer surface of the board. For example, the roller reduces the chance for roller slippage over the board to which the finish is being applied. Such slippage can undesirably result in variation in thickness of the applied finish composition. In some embodiments, as an alternative to a bottom roller, a plate such as an anvil plate can be used.

The vertical gap between the finish roller and bottom roller can be adjusted to accommodate different clearances between them, for example, to accommodate different board thickness. In some embodiments, the bottom roller remains stationary while the finish roller is moved up and down to adjust the gap. However, other variations are possible, including having the height of the bottom roller adjustable or having both the finish roller and the bottom roller being adjustable.

The doctor roller typically is formed at least in part with suitable metal. For example, in some embodiments, the metal is steel such as stainless steel to avoid rusting given that the finish composition is normally in the form of aqueous slurry. The surface can be plated with chrome or the like to allow the doctor roller to remain as clean as possible in operation.

The composition of the finish roller may vary, for example, depending on whether a direct finishing or reverse finishing arrangement is employed. For example, in some embodiments of a direct finishing arrangement, the finish roller can be formed of metal with a softer cover such as formed from one or more rubbers or elastomeric material such as neoprene, ethylene propylene diene monomer (EDPM) rubber, or the like. In this respect, it is understood that the article to be finished, including mat-faced board, are not perfectly flat because of, for example, surface imperfections. Thus, in accordance with embodiments of the invention, a cover (e.g., made of rubber material) can be used to conform to surface imperfections in the board or other article to allow for an even more finish. Rubbers are desirable materials for this purpose because of compressibility property and long wear life. They also tend to be materials that are easy to keep clean. The use of a steel finish roller can be less desirable in some embodiments of direct finishing arrangements. For example, where surface imperfections are prevalent, a steel finish roller is less apt to conform to the surface. The applied finish will have variation with a thicker finish being observed where there are depressions in the board surface and a thinner finish observed where there are protrusions in the board surface.

However, in some instances, such as some reverse finish arrangements, the finish roller can be formed from metal such as steel to reduce wear. In this respect, where the finish roller is rotating in a direction opposite as the board is traveling, the finish roller will exhibit undesirable wear characteristics in operation if the finish roller is made of softer material such as rubber. Furthermore, a rubber finish roller may at times create excessive traction such that the board undesirably could be pushed backwards.

It will be understood the grooves, if present, can be in any suitable configuration. Grooves advantageously allow for more surface area for finish to be applied. The grooves can be cut into the rubber cover and/or into a metal roller in various embodiments, with grooves being particularly advantageous in rubber covered embodiments of finish roller because rubber in some embodiments is easier to clean. In some embodiments, the finish roller comprises a buttress thread form to define the grooves in some embodiments. In embodiments including the buttress thread configuration, any suitable buttress thread count per longitudinal inch of the roller can be used. For example, in some embodiments, the finish roller has from about 4 to about 50 buttress thread per inch of longitude, such as from about 8 to about 12 buttress thread per inch (e.g., about 10 buttress thread per inch).

In some embodiments, the finish roller has a longitudinal axis and the groove(s) are circumferential such that they are perpendicular, or nearly perpendicular, to the axis. The grooves can have any suitable depth, such as a depth from about 0.001 inch to about 0.25 inch (e.g., from about 0.05 inch to about 0.20 inch). The grooves can have any suitable width, for example, from about 0.001 inch to about 0.25 inch, such as from about 0.08 inch to about 0.012 inch.

The size of the rollers can vary. For example, the radius of the finish roller is dependent on the line speed of the article being finished, and the viscosity of the finish composition. The length of the finish roller is dependent on the width of the panels being finished and normally the length of the roller is somewhat longer than the width of the product (e.g., 10 to 15% longer), for example, to ensure the product is finished across the entire width. The radius of the doctor roller may be dependent on the radius of the finish roller, speed of doctor roller, finish viscosity, etc. In some embodiments, the doctor roller has a smaller diameter than the finish roller so its axis is substantially the same elevation as the axis of the finish roller, while its bottom surface is above the top surface of the panel 218. The length of the doctor roller should normally be the same as the length of the finish roller, with dams on the ends of these rollers, to prevent hydrophobic finish composition coating from spilling over.

The finish roller is normally fabricated from steel, and can have one or more covers with any suitable hardness. In some embodiments, the hardness of the finish roller is selected to be softer than the doctor roller to allow the doctor roller to compress the finish roller as the rollers engage which is advantageous in controlling the amount of finish composition to be deposited. For example, the cover(s) can be such that the finish roller can have a hardness of about 100 Durometer or less as determined according to Shore-A, such as about 70 Durometer Shore-A or less (e.g., about 40 Durometer Shore-A) with the doctor roller desirably having higher corresponding hardness value than the selected value for the finish roller in some embodiments. If desired, the finish roller cover(s) comprises neoprene, EPDM, or a combination thereof to help reduce surface hardness while maintaining a harder core in some embodiments. For direct finish configurations, desirably the finish roller can be formed from rubber in order to allow if to conform to the imperfect surface of the board, resulting in a more uniform finishing thickness. In reverse finish configurations, a roller with no cover can be used in some embodiments, for example, a chrome-plated smooth steel finish roller because this allows for greater resistance to wear, while also minimizing frictional force against the top surface 530 of the board 524, and minimizing the amount of finishing adhering on the roller surface.

The gap between adjacent surfaces of the doctor roller and finish roller in some embodiments are in an interference fit such that the gap is defined by a negative number as understood in the art. The negative numbers refer to the amount of interference, for example, the difference between the sum of the outmost radii of the finish roller and the doctor roller, and the actual distance between axes of these two rollers. In some embodiments where the finish roller is generally softer than the doctor roller, the doctor roller can compress the finish roller when the rolls are positioned this way. The gap between the doctor roller and finish roller may be adjusted depending on factors including the viscosity of the finishing composition, the speed of the rollers, and whether direct or reverse roller configurations are employed. In direct roller finishing, the finish roller and the doctor roller are disposed to define a gap therebetween in some embodiments from about +0.010 inch (about +0.025 cm) to about −0.020 inch (about −0.051 cm), such as from about −0.005 inch (about −0.013 cm) to about −0.010 inch (about −0.025 cm), for example, about −0.007 inch (about −0.018 cm). In reverse finishing arrangements, the gaps can be somewhat larger, for example, from zero to about +0.010 inch in some embodiments.

In some embodiments, the roller assembly is configured such that a gap between the finish roller and the bottom roller is less than the average panel thickness by about 0 inch (about 0 cm) to about 0.10 inch (about 0.25 cm), such as by about 0.01 inch (about 0.25 cm) to about 0.08 inch (about 0.20 cm), for example, by about 0.02 inch (about 0.51 cm) to about 0.06 inch (about 0.15 cm).

To make the novel non-setting, hydrophobic finish, components are combined and mixed until a homogeneous blend is obtained. Preferably, the mixer is a high shear mixer providing a short residence time. Because the inventive non-setting, hydrophobic finish is a drying finish, mixing and subsequent application methods may be done in batch rather than continuously. For example, a batch mixer is preferred in some applications, particularly where the slurry must be fed to more than one area of the manufacturing line. The wet ingredients are charged to the mixer, followed by the dry components. After mixing, the entire batch is dumped into a pot for continuous distribution to the line. If distribution to more than one location is desired, multiple pumps with separate destinations can be used to distribute slurry from the pot.

After mixing, the flowable slurry exits from the mixer and can be poured into a mold or extruder, onto release paper or onto a base mat for shaping into an appropriate shape. Any method may be used to shape the composition, including molding, extruding, troweling, calendaring, rolling, screeding, or any shaping method suitable for the article being produced.

Methods of applying hydrophobic finish composition also include spraying, curtain coating, and knife coating.

Cementitious Core

The products described herein have a cementitious core. The cementitious core can comprise any material, substance, or composition containing or derived from gypsum and/or hydraulic cement, along with any suitable additives. Non-limiting examples of materials that can be used in the cementitious core include Portland cement, sorrel cement, slag cement, fly ash cement, calcium alumina cement, water-soluble calcium sulfate anhydrite, calcium sulfate α-hemihydrate, calcium sulfate β-hemihydrate (calcium sulfate hemihydrates are also known as "stucco"), natural, synthetic or chemically modified calcium sulfate hemihydrates, calcium sulfate dihydrate (calcium sulfate dihydrate is also known as "gypsum," "set gypsum," or "hydrated gypsum"), and mixtures thereof. As used herein, the term "calcium sulfate material" refers to any of the forms of calcium sulfate referenced above. In gypsum boards, calcium sulfate hemihydrate upon reaction with water eventually gets converted to calcium sulfate dihydrate. However, gypsum boards can contain some calcium sulfate hemihydrate which is formed due to overheating and dehydration of calcium sulfate dihydrate in the kiln.

Preferably, the cementitious core is either (a) a cement-based core comprising more than 20 wt % Portland cement on a water-free basis or (b) a gypsum-based core comprising more than 50 wt % gypsum on a water-free basis. More preferably, the cementitious core is either (a) a cement-based core comprising more than 40 wt % Portland cement on a water-free basis (e.g., about 50 wt % to about 95 wt %, or about 60 wt % to about 75 wt %) or (b) a gypsum-based core comprising more than about 70 wt % gypsum on a water-free basis (e.g., about 70 wt % to about 95 wt %, or about 80 wt % to about 90 wt %).

The additives for the cementitious core can be any additives commonly used to produce products described herein, such as gypsum board or cement board. Such additives include, without limitation, structural additives such as mineral wool, continuous or chopped glass fibers (also referred to as fiberglass), perlite, clay, vermiculite, calcium carbonate, polyester, and paper fiber, as well as chemical additives such as foaming agents, fillers (setting and/or non-setting), accelerators, sugar, enhancing agents such as phosphates, phosphonates, borates and the like, retarders, binders (e.g., starch and latex), colorants, fungicides, biocides, and the like. Examples of the use of some of these and other additives are described, for instance, in U.S. Pat. Nos. 6,342,284; 6,632,550; 6,800,131; 5,643,510; 5,714,001; and 6,774,146; and US Patent Application Publication Nos. 2004/0231916 A1; 2002/0045074 A1; and 2005/0019618 A1.

Preferably, the cementitious core comprises a calcium sulfate material, Portland cement, or mixture thereof. Advantageously, if desired, in some embodiments, the cementitious core also comprises a hydrophobic agent, such as a silicone-based material (e.g., a silane, siloxane, or silicone-resin matrix), in a suitable amount to improve the water resistance of the core material. It is also preferred that the cementitious core comprise a siloxane catalyst, such as magnesium oxide (e.g., dead burned magnesium oxide), fly ash (e.g., Class C fly ash), or a mixture thereof. The siloxane and siloxane catalyst can be added in any suitable amount, and by any suitable method as described herein with respect to the method of preparing water-resistant products described herein, or as described, for example, in US Patent Application Publication Nos. 2006/0035112 A1 or 2007/0022913 A1. Desirably, the cementitious core also comprises strength-improving additives, such as phosphates (e.g., polyphosphates as described in U.S. Pat. Nos. 6,342,284; 6,632,550; and 6,800,131 and U US Patent Application Publication Nos. 2002/0045074 A1; 2005/0019618 A1; and 2007/0022913 A1) and/or pre-blended unstable and stable soaps (e.g., as described in U.S. Pat. Nos. 5,683,635 and 5,643,510).

The cementitious core can comprise paper (cellulosic) or glass fibers, but is preferably substantially free of paper and/or glass fibers (e.g., comprises less than about 1 wt %, less than about 0.5 wt %, less than about 0.1 wt %, or even less than about 0.05 wt % of paper and/or glass fibers, or contains no such fibers), wherein the foregoing wt % values are based upon weight of the cementitious core on a water-free (dry) basis. For the purposes herein, the cementitious core can include one or more dense skim coats and/or hard edges, as is known in the art.

The cementitious core can be any of any type or shape suitable for a desired application. Non-limiting examples of products described herein include gypsum panels (also known as gypsum boards or gypsum based boards) and cement panels (also known as cement panels or cement based boards) of any size and shape. The term cementitious panel encompasses both a gypsum panel and a cement panel. A gypsum panel has over 50 wt % gypsum in its core on a dry basis. A cement panel has over 20 wt % Portland cement in its core on a dry basis. Optionally, a cement panel further comprises gypsum and other additives.

Fibrous Mat Substrate Optionally with Binder Pre-Coating

The fibrous mat substrates (also referred to herein as fibrous mats) in the products described herein can include polymer fibers, mineral fibers, or a combination thereof. Further, one face of the fibrous mat substrate can optionally include a binder pre-coating.

Non-limiting examples of suitable fibers for use in a fibrous mat substrate include glass fibers, polyamide fibers, polyaramide fibers, polypropylene fibers, polyester fibers (e.g., polyethylene terephthalate (PET)), polyvinyl alcohol (PVOH), polyvinyl acetate (PVAc), cellulosic fibers (e.g., cotton, rayon, and the like), and the like, as well as combinations thereof. Furthermore, the fibers of the mat can be hydrophobic or hydrophilic, finished or unfinished. Of course, the choice of fibers will depend, in part, on the type of application in which the cementitious article is to be used. For example, when the cementitious article is used for applications requiring heat or fire resistance, appropriate heat or fire resistant fibers should be used in the fibrous mat.

The fibrous mat can be woven or non-woven; however, non-woven mats are preferred. Non-woven mats comprise fibers bound together by a binder. The binder can be any binder typically used in the mat industry. Suitable binders include, without limitation, urea formaldehyde, melamine formaldehyde, stearated melamine formaldehyde, polyester, acrylics, polyvinyl acetate, urea formaldehyde or melamine formaldehyde modified or blended with polyvinyl acetate or acrylic, styrene acrylic polymers, and the like, as well as combinations thereof. Suitable fibrous mats include commercially available mats used as facing materials for cementitious articles.

By way of further illustration, a non-limiting example of a suitable glass fiber mat comprises about 80-90 percent (e.g., about 83 percent) 16 micron diameter, ½-inch to 1-inch long (about 1.2-2.5 cm long) continuous filament fibers and about 10-20 percent (e.g., about 17 percent) biosoluble microfibers having about 2.7 nominal micron diameter (MICRO-STRAND' Type 481, manufactured by Johns Manville) with a basis weight of about 24 lbs/1000 ft2. One suitable glass fiber mat is the DURAGLASS™ 8924G Mat, manufactured by Johns Manville. Other suitable glass fiber mats are DURAGLASS™ 8929 Mat, DURAGLASS™ 7594, DURAGLASS™ 7524, all from Johns Manville. The binder for the fibrous mat can be any suitable binder, for example, styrene acrylic binder, which can be about 19-27% (+/−3%) by weight of the mat. The fibrous mat can include a colored pigment, for example, green pigment or colorant. The weight of fibrous mat can be between 15-40 pounds per 1000 square feet (lbs/MSF), and the thickness can range between 10-40 mils.

The finish material can be applied to the fibrous mat as a liquid or solid material (e.g., resin, wet-dispersed powder, dry powder, or film) by any of various methods known in the art. For instance, the hydrophobic finish materials can be applied by brushing, spraying, rolling, pouring, dipping, sifting, or overlaying the hydrophobic finish material. Solid materials, such as powders, can be dispersed prior to application using any common solvent (e.g., water, alcohols, and the like) or dispersant, provided the solvent or dispersant does not react adversely with the fibrous mat materials. Solvents that etch surface fibers of the fibrous mat, and thereby enhance the ability of the finish material to adhere to the mat, also can be used. Preferably, any solvent or dispersant used is easily dried and does not leave a residue that prevents the finish from adhering to the fibrous mat. Liquid or dispersed finish materials can have any viscosity suitable for application to the fibrous mat. Typically, the viscosity of a liquid or dispersed finish material will be from about 50-200 Kreb's units (KU) (about 300-20,000 cP), such as about 80-150 KU (about 800-8,000 cP).

Recognizing that the surface of the fibrous mat is an irregular surface, the finish material need not provide a finish that is completely continuous. When a liquid or powder finish composition is used, for instance, the finish material may fall within the voids between the fibers of the mat leaving gaps or holes in the finish. However, the finish material preferably is applied in an amount sufficient to provide a finish that is continuous and, desirably, coextensive with the dimensions of the first fibrous mat.

Preferably the fibrous mat is a pre-coated fibrous mat. As used herein, "pre-coated mat" and grammatical derivations thereof refer to a mat is coated with binder coating before being applied to the cementitious core material. Further, the ensuing description the terms "web" and "mat" are employed interchangeably, and in the sense that the mats and webs can be used as "facers," all three terms may be utilized interchangeably. The coated fibrous mat suitable for use (e.g., as a facer in a gypsum board or other cementitious board) is formed by a process which uses a substantially porous, predominately fibrous mat substrate. The fibrous mat substrate comprises non-woven glass fibers. The binder pre-coating of the coated fibrous mat advantageously penetrates 10-75% into the thickness of the mat, preferably from approximately 25%-75% of the mat thickness, thereby affording higher tensile strengths. To whatever depth in this range (10%-75% of the mat thickness) the coating extends essentially uniformly. The uniformly deep penetration is achieved by one or more coating techniques described in US Patent Application Publication No. 2007/0042657 A1 to Bush et al, incorporated herein by reference, which facilitate increased exposure of coating mixture to a fibrous mat substrate, thereby achieving more uniform coating penetration. The uncoated thickness (preferably approximately 25% up to 90% of the thickness) of the fibrous mat is sufficiently thick for bonding purposes with the cementitious slurry, such as a gypsum slurry or other slurry of cementitious core materials.

The raw, uncoated fibrous mat substrate has a weight between about 12 lbs/MSF and about 50 lbs/MSF. The coating is present in an amount of about 40 lbs/MSF to about 165 lbs/MSF, preferably 50-100 lbs/MSF, more preferably 61 to 75 lbs/MSF, and being only partially permeated into the fibrous mat substrate. On average, the weight of the coated fibrous mat per unit area is no more than about six times the weight of the fibrous mat substrate prior to coating. The coating also preferably imparts a tensile strength to the coated fibrous mat which on average is at least 1.33 times greater than the tensile strength of the fibrous mat substrate without the coating. The porosity of the coated fibrous mat is sufficiently low that it is not penetrable by gypsum slurry or other cementitious slurry, yet (in the case of where gypsum slurry is employed) porous enough to allow water vapor to escape from the gypsum slurry when heated. The porosity of the coated fibrous mat is porous enough to allow gypsum slurry or other cementitious slurry, to completely cover essentially all exposed, individual glass fibers. Preferably the porosity of the coated fibrous mat is in a range of from about 1.3 CFM (cubic feet per minute per square foot) to about 5.0 CFM.

Suitable fibrous mats include commercially available mats used as facing materials for cementitious articles.

Suitable polymer binders for the binder pre-coating include, without limitation, the above described urea formaldehyde, melamine formaldehyde, stearated melamine formaldehyde, polyester, acrylics, polyvinyl acetate, urea formaldehyde or melamine formaldehyde modified or blended with polyvinyl acetate or acrylic, styrene acrylic polymers, and the like, as well as combinations thereof.

Commonly used monomers for the pre-coating polymer are butyl acrylate, methyl methacrylate, ethyl acrylate and the like. Preferably, the monomers include one or more monomers selected from the group consisting of n-butyl acrylate, methyl methacrylate, styrene, and 2-ethylhexyl acrylate.

The pre-coating polymer is preferably derived from at least one acrylic monomer selected from the group consisting of acrylic acid, acrylic acid esters, methacrylic acid, and methacrylic acid esters. For example, the polymer can be a butyl acrylate/methyl methacrylate copolymer or a 2-ethylhexyl acrylate/methyl methacrylate copolymer. For example, the at least one polymer can be a butyl acrylate/methyl methacrylate copolymer or a 2-ethylhexyl acrylate/methyl methacrylate copolymer. Typically, the at least one polymer is further derived from one or more monomers selected from the group consisting of styrene, alpha-methyl styrene, vinyl chloride, acrylonitrile, methacrylonitrile, ureido methacrylate, vinyl acetate, vinyl esters of branched tertiary monocarboxylic acids, itaconic acid, crotonic acid, maleic acid, fumaric acid, ethylene, and C4-C8 conjugated dienes such as 1,3-butadiene, isoprene or chloroprene.

For example, the pre-coating polymer can be a pure acrylic, a styrene acrylic, a vinyl acrylic or an acrylated ethylene vinyl acetate copolymer.

The pure acrylics preferably comprise acrylic acid, methacrylic acid, an acrylate ester, and/or a methacrylate ester as the main monomers). The styrene acrylics preferably comprise styrene and acrylic acid, methacrylic acid, an acrylate ester, and/or a methacrylate ester as the main monomers. The vinyl acrylics preferably comprise vinyl acetate and acrylic acid, methacrylic acid, an acrylate ester, and/or a methacrylate ester as the main monomers. The acrylated ethylene vinyl acetate copolymers preferably comprise ethylene, vinyl acetate and acrylic acid, methacrylic acid, an acrylate ester, and/or a methacrylate ester as the main monomers. The monomers can also include other main monomers such as acrylamide and acrylonitrile, and one or more functional monomers such as itaconic acid and ureido methacrylate, as would be readily understood by those skilled in the art. In a particularly preferred embodiment, the film-forming polymer is a pure acrylic such as a butyl acrylate/methyl methacrylate copolymer derived from monomers including butyl acrylate and methyl methacrylate.

Preferably the polymer binder for the binder pre-coating is a latex, most preferably acrylic latex. A latex is a stable dispersion (emulsion) of polymer microparticles in an aqueous medium. Examples of polymer latex binders include, but are not limited to, styrene-butadiene-rubber (SBR), styrene-butadiene-styrene (SBS), ethylene-vinyl-chloride (EVCI), poly-vinylidene-chloride (PVdC), modified poly-vinyl-chloride (PVC), poly-vinyl-alcohol (PVOH), ethylene-vinyl-acetate (EVA), poly-vinyl-acetate (PVA), and styrene-acrylate (SA). No asphalt is used as a binder in this invention. The latex binder (polymer) of the coating may comprise polymers derived from versatic acid and/or versatic acid esters as disclosed by US Patent Application Publication No. 2010/0087114 incorporated herein by reference. A suitable latex may also be one comprising carboxylated styrene butadiene (SBR).

Synthetic latexes are typically made by emulsion polymerization. Emulsion polymerization is a type of radical polymerization that usually starts with an emulsion incorporating water, monomer, and surfactant. For example, synthetic latexes suitable for use in the present coatings acrylates are made by polymerizing a monomer such as acrylic acid emulsified with surfactants to make an acrylic latex binder, preferably an acrylic latex polymer binder comprised of an acrylic or vinyl ester of a versatic acid isomer.

The most common type of emulsion polymerization is an oil-in-water emulsion, in which droplets of monomer (the oil) are emulsified (with surfactants) in a continuous phase of water. Water-soluble polymers, such as certain polyvinyl alcohols or hydroxyethyl celluloses, can also be used to act as emulsifiers/stabilizers. Although termed "emulsion polymerization," rather than occurring in emulsion droplets, polymerization takes place in the latex particles that form spontaneously in the first few minutes of the process. These latex particles are typically 100 nm in size, and are made of many individual polymer chains. The particles are stopped from coagulating with each other because each particle is surrounded by the surfactant; the charge on the surfactant repels other particles electrostatically.

Coating techniques of US Patent Application Publication No. 2007/0042657, incorporated herein by reference, facilitate increased exposure of the coating mixture to a fibrous mat substrate, and thereby a uniformly deeper penetration of the coating into the interior spaces of the fibrous mat. The penetration is to a depth of at least 25%, but preferably less than about 75%, of the thickness of the mat, i.e., not so far that it penetrates entirely. Such increased exposure and uniformly deep penetration is accomplished by various techniques including but not limited to those hereinafter specifically described by US Patent Application Publication No. 2007/0042657.

Preferably the coating for pre-coating the fibrous mat contains inorganic filler materials. These inorganic particles may be inorganic non-setting filler or inorganic setting filler (also referred to as inorganic binder).

Calcium sulfate can be both a non-setting mineral pigment (as calcium sulfate dihydrate) and a setting binder (as calcium sulfate hemi-hydrate). Examples of the inorganic binders with the latex binders in the coatings of pre-coated glass fiber mats employed in this invention include, but are not limited to, calcium oxide, calcium silicate, limestone containing quicklime (CaO), volcanic ash, rice husk ash, metakaolin, fly ash, clay containing calcium silicate, sand containing calcium silicate, aluminum trihydrate containing aluminum oxide, and magnesium oxide containing either the sulfate or chloride of magnesium, or both, calcium sulfate hemi-hydrate, magnesium oxychloride, magnesium oxysulfate, and other complexes of some Group IIA elements (alkaline earth metals), as well as aluminum hydroxide. One example of such a complex inorganic binder is common Portland cement, which is a mixture of various calcium-aluminum silicates. However, Portland cement cures by hydration, which can create a coating mixture with a short shelf life. Also, both the oxychloride and the oxysulfate of magnesium are complex inorganic binders which cure by hydration. Such a coating must be used quickly or could set up hard. The oxychloride or oxysulfate of magnesium, aluminum hydroxide, and calcium silicate are only very slightly soluble in water, and are useful binders of this invention. Inorganic binders which are quickly soluble in water, such as sodium silicate, are presently not thought to be usable in hostile weather for long periods. The preferred inorganic binder of this invention is quicklime, which does not hydrate in a coating mix, but cures by slowly converting to limestone by adding carbon dioxide from the air, and thus is not soluble in water.

Examples of non-setting, inorganic fillers with the latex binders in the coatings of pre-coated glass fiber mats employed in this invention are, but are not limited to: ground limestone (calcium carbonate), clay, sand, mica, talc, gypsum (calcium sulfate dihydrate), aluminum trihydrate (ATH), antimony oxide, microspheres, or a combination of any two or more of these substances.

The binder pre-coating comprises 3 wt % to 10 wt % polymer and 90 wt % to 97 wt % inorganic filler (setting or non-setting) on a water free basis, preferably 4 wt % to 7 wt % polymer and 93 wt % to 96 wt % inorganic filler on a dry (in other words water free) basis. Typically the filler is about 90 wt % to 95 wt % of the binder pre-coating.

The weight of pre-coated fibrous mat is typically 50-215 lbs/MSF, and the thickness is 15-65 mils. Suitable pre-coated fibrous mats include WT ES 9000 series and WT PS-1G 9000 series coated glass facers from Atlas Web Technologies/WEBTECH®, Meridian, Miss.

Clauses Describing Various Aspects of Compositions and Methods of the Invention

Clause 1. A mat-faced cementitious board comprising: (a) a cementitious core; (b) a fibrous mat having an inner first surface facing at least one face of the cementitious core and an outer second surface, wherein the inner first surface and the outer second surface are opposed; (c) a hydrophobic, non-setting coating resulting from applying to the outer second surface of the fibrous mat a layer of hydrophobic finish composition comprising: (i) about 50% to about 80% by weight a non-setting, inorganic filler having a mean particle diameter of about 12 microns to about 35 microns, preferably about 13 to about 25 microns, more preferably about 15 to about 25 microns and most preferably about 15 to about 20 microns, (ii) about 20% to about 50% by weight an aqueous dispersion of a film-forming polymer, (iii) 0% to about 30% by weight additional water; (iv) an absence of fly ash, (v) an absence of pozzolanic material, (vi) an absence of hydraulic cement, (vii) an absence of calcium sulfate hemihydrate, and (viii) an absence of calcium sulfate anhydrite; and wherein the hydrophobic surface coating adheres to the outer second surface of the fibrous mat and the cementitious core adheres to the opposed inner first surface of the fibrous mat.

Clause 2. The mat-faced cementitious board of Clause 1, wherein the fibrous mat comprises: (1) a fibrous mat substrate having non-woven glass fibers, and (2) a binder pre-coating comprising (a) polymer binder and (b) a setting or non-setting inorganic filler, wherein the binder pre-coating uniformly penetrates the fibrous mat substrate from the outer second surface of the fibrous mat to a depth which is a fraction of the thickness of the fibrous mat, the binder pre-coating is present in an amount of about 40 lbs/MSF to about 165 lbs/MSF of the fibrous mat, wherein penetration of the binder pre-coating into the mat thickness is 10 percent to 75 percent of the mat thickness; and wherein the hydrophobic, non-setting coating is adjacent the binder pre-coating.

Clause 3. The mat-faced cementitious board of clause 1, wherein penetration of the hydrophobic coating into the mat thickness is 10 to 50 percent of the mat thickness on pre-coated mats.

Clause 4. The mat-faced cementitious board of clause 1, wherein the fibrous mat comprises:

a fibrous mat substrate having non-woven glass fibers, wherein penetration of the hydrophobic coating into the mat thickness is 40 percent to 80 percent, preferably 60 to 80 percent, of the mat thickness, and wherein the inorganic filler is selected from at least one member of the group consisting of inorganic pigment and inorganic binder; wherein the fibrous mat substrate is not pre-coated, and wherein the hydrophobic coating is directly on the non-woven glass fibers.

Clause 5. The mat-faced cementitious board of Clause 1 or 2, wherein the fibrous mat is a first fibrous mat, wherein the hydrophobic, non-setting coating is a first hydrophobic, non-setting coating, and wherein the mat-faced cementitious board further comprises: (d) a second fibrous mat having an inner first surface facing at least one face of the cementitious core, and an outer second surface, wherein the inner first surface and the outer second surface of the second fibrous mat are facing opposing faces of the cementitious core; (e) a second hydrophobic, non-setting coating resulting from applying to the outer second surface of the second fibrous mat a layer of the hydrophobic finish composition; and wherein the second hydrophobic surface coating adheres to the outer second surface of the second fibrous mat and a surface of the cementitious core opposed to the first fibrous mat adheres to the opposed inner first surface of the second fibrous mat.

Clause 6. The mat-faced cementitious board of Clause 5, wherein the second fibrous mat comprises: (1) a fibrous mat substrate having non-woven glass fibers, and (2) a binder pre-coating comprising (a) polymer binder and (b) a setting or non-setting inorganic filler, wherein the binder pre-coating uniformly penetrates the fibrous mat substrate from the outer second surface of the fibrous mat to a depth which is a fraction of the thickness of the fibrous mat, the binder pre-coating is present in an amount of about 40 lbs/MSF to about 165 lbs/MSF of the fibrous mat, wherein penetration of the binder pre-coating into the mat thickness is 10 percent to 75 percent of the mat thickness; and wherein the second hydrophobic, non-setting coating is adjacent the binder pre-coating of the second fibrous mat.

Clause 7. The mat-faced cementitious board of any of the preceding Clauses, wherein the film-forming polymer comprises at least one polymer selected from the group consisting of: an acrylic polymer; a styrene-butadiene rubber; a copolymer of styrene and acrylic; a copolymer of vinyl acetate and ethylene; a copolymer of vinyl chloride and ethylene; a copolymer of vinyl acetate and vinyl ester of versatic acid; a copolymer of vinyl laurate and ethylene; a terpolymer of vinyl acetate, ethylene, and methyl methacrylate; a terpolymer of vinyl acetate, ethylene, and vinyl laurate; a terpolymer of vinyl acetate, ethylene, and vinyl esters of branched tertiary monocarboxylic acids; and any combination thereof.

Clause 8. The mat-faced cementitious board of any of the preceding Clause, wherein the hydrophobic finish further comprises (ix) at least one additive selected from the group consisting of: a water reducing admixture additive; a colorant; a fungicide, a mildewcide, and any combination thereof.

Clause 9. The mat-faced cementitious board of any of the preceding Clause, wherein the non-setting, inorganic filler comprises perlite.

Clause 10. The mat-faced cementitious board of any of the preceding Clause, wherein the hydrophobic finish composition comprises an absence of perlite.

Clause 11. The mat-faced cementitious board of any of the preceding Clause, wherein the inorganic, non-setting filler comprises at least about 50% or more of calcium carbonate by weight of the inorganic, non-setting filler.

Clause 12. The mat-faced cementitious board of any of the preceding Clause, wherein the inorganic, non-setting filler has the 15 microns to about 20 microns.

Clause 13. The mat-faced cementitious board of any of the preceding Clause, wherein the cementitious core is a cement-based core comprising more than 20 wt % Portland cement on a water-free basis.

Clause 14. The mat-faced cementitious board of any of the preceding Clause, wherein the cementitious core is a gypsum-based core comprising more than 50 wt % gypsum on a water-free basis.

Clause 15. A method of preparing the mat-faced cementitious board of any of Clause 1 to 14, comprising: (a) preparing the board comprising the fibrous mat having the inner first surface facing at least one face of the cementitious core and the outer second surface, wherein the inner first surface and the outer second surface are opposed; (b) applying the hydrophobic finish to the outer second surface of the fibrous mat; and (c) drying the hydrophobic finish to produce the hydrophobic, non-setting coating to form the mat-faced cementitious board.

Clause 16. The method of Clause 15, wherein the hydrophobic finish is applied to the outer second surface of the fibrous mat at about 50 lbs/MSF and about 150 lbs/MSF.

Clause 17. The method of Clause 15 or 16, wherein the fibrous mat comprises: (1) a fibrous mat substrate having non-woven glass fibers, and (2) a binder pre-coating comprising (a) polymer binder and (b) a setting or non-setting inorganic filler, wherein the binder pre-coating uniformly penetrates the fibrous mat substrate from the outer second surface of the fibrous mat to a depth which is a fraction of the thickness of the fibrous mat, the binder pre-coating is present in an amount of about 40 lbs/MSF to about 165 lbs/MSF of the fibrous mat, wherein penetration of the binder pre-coating into the mat thickness is 10 percent to 75 percent of the mat thickness; and wherein the hydrophobic finish is adjacent the binder pre-coating of the fibrous mat.

Clause 18. The method of one of Clauses 15-17, wherein the fibrous mat is a first fibrous mat; wherein the hydrophobic, non-setting coating is a first hydrophobic, non-setting coating; wherein the board further comprises: a second fibrous mat having an inner first surface facing at least one face of the cementitious core, and an outer second surface, wherein the inner first surface and the outer second surface of the second fibrous mat are facing opposing faces of the cementitious core; and wherein the method further comprises (c) providing a second hydrophobic, non-setting coating resulting from applying the hydrophobic finish to the outer second surface of the second fibrous mat and drying the hydrophobic finish on the outer second surface of the second fibrous mat.

Clause 19. The method of Clause 18, wherein the second fibrous mat comprises: (1) a fibrous mat substrate having non-woven glass fibers, and (2) a binder pre-coating comprising (a) polymer binder and (b) a setting or non-setting inorganic filler, wherein the binder pre-coating uniformly penetrates the fibrous mat substrate from the outer second surface of the fibrous mat to a depth which is a fraction of the thickness of the fibrous mat, the binder pre-coating is present in an amount of about 40 lbs/MSF to about 165 lbs/MSF of the fibrous mat, wherein penetration of the binder pre-coating into the mat thickness is 10 percent to 75 percent of the mat thickness; and wherein the hydrophobic finish is adjacent the binder pre-coating of the second fibrous mat.

Clause 20. The method of one of Clauses 15-19, wherein film-forming polymer comprises at least one polymer selected from the group consisting of: an acrylic polymer; a styrene-butadiene rubber; a copolymer of styrene and acrylic; a copolymer of vinyl acetate and ethylene; a copolymer of vinyl chloride and ethylene; a copolymer of vinyl acetate and vinyl ester of versatic acid; a copolymer of vinyl laurate and ethylene; a terpolymer of vinyl acetate, ethylene, and methyl methacrylate; a terpolymer of vinyl acetate, ethylene, and vinyl laurate; a terpolymer of vinyl acetate, ethylene, and vinyl esters of branched tertiary monocarboxylic acids; and any combination thereof.

Clause 21. The method of one of Clauses 15-20, wherein the hydrophobic finish further comprises (ix) at least one additive selected from the group consisting of: a water reducing admixture additive; a colorant; a fungicide, a mildewcide, and any combination thereof.

Clause 22. The method of one of Clauses 15-21, wherein the inorganic, non-setting filler comprises at least about 50% or more of calcium carbonate by weight of the inorganic, non-setting filler.

Clause 23. The method of one of Clauses 15-22, wherein the cementitious core is a cement-based core comprising more than 20 wt. % Portland cement on a water-free basis.

Clause 24. The method of one of Clauses 15-23, wherein the cementitious core is a gypsum-based core comprising more than 50 wt. % gypsum on a water-free basis.

EXAMPLES

In the examples herein, as mentioned above, percentages of compositions or product formulae are in weight percentages, unless otherwise expressly stated. The reported measurements also in approximate amounts unless expressly stated, for example, approximate percentages, weights, temperatures, distances or other properties.

Example 1

A non-setting, hydrophobic coating was prepared according to the formulation in TABLE 2.

TABLE 2

Example Non-Setting, Hydrophobic Coating Formulation

| Component | Weight % (on a wet basis) |
|---|---|
| calcium carbonate having a mean particle size in the range of about 18 microns | 63.4 |
| a styrenated acrylic copolymer dispersion at 47 wt % solids | 33.4 |
| *superplasticizer (poly-naphthalene sulfonate calcium salt dispersion at 33-36 wt % solids) | 0.8 |
| AQUABLAK ® 5106 colorant | 0.2 |
| mildewcide | 0.1 |
| Additional Water | 2.0 |

*Diluted 1:1 with water.

Figure 6:
FIG. 6 is a photograph of a Sheen cup used for measuring viscosity of a slurry.

The viscosity of the non-setting, hydrophobic coating slurry was measured using a Sheen cup (model 401/6, BS 3900, A6-1971, with an opening of 7.14 mm). A Sheen cup 600, illustrated in FIG. 6, is similar to a Ford cup, but with a bigger opening to allow for testing of more viscous materials. The cup orifice was sealed, usually with a finger, while the slurry was filled flush with the top. The finger seal was then removed and stopwatch was started simultaneously. The time was stopped at the first break in flow, which represents the 'flow-time' of the test or the viscosity of the coating slurry. The viscosity of the formulation in TABLE 2 measured by the Sheen cup was 15 seconds.

The non-setting, hydrophobic coating slurry was applied to the surface of the glass-mat faced gypsum board using a roller coater. One coating application was used, where different coating weights were achieved by adjusting the machine settings. The coated boards then went through a dryer to dry the coating.

The finished boards were conditioned at 75° F. and 50% relative humidity overnight. Then, the Cobb test described above was performed on the samples with the results provided in TABLE 3.

TABLE 3

Surface Water Absorption of Boards having a Non-Setting, Hydrophobic Coating

| Coating weight (lbs/MSF) | Surface water absorption (gram) |
|---|---|
| 70 | 0.22 |
| 83 | 0.11 |
| 95 | 0.11 |

The results showed that even at a relatively low coating weight of 70 lbs/MSF, the surface water absorption was great at 0.24 grams. The surface water absorption got even less at higher coating weights.

Example 2

Several samples were prepared using the formulation in Table 2 but with the HUBERCRETE® M PRIME (calcium carbonate) replaced with other non-setting, inorganic fillers having different mean particle diameters. The viscosity was measured for each and provided in TABLE 4.

TABLE 4

Sheen Cup Viscosity of Non-Setting, Hydrophobic Coating Slurries with Different Sized Non-Setting, Inorganic Fillers

| Non-setting, inorganic filler | ground marble (calcium carbonate) | calcium carbonate having a mean particle size in the range of about 18 microns | ground marble (calcium carbonate) | ground marble (calcium carbonate) |
|---|---|---|---|---|
| Mean particle diameter (micron) | 11 | 18 | 39 | 156 |
| Sheen cup reading (seconds) | 26 | 18 | 12 | 9 |
| Visual observations | | | Settles fast | Settles fast |

This example illustrates that a relatively narrow range of the mean particle diameters are suitable for preparing a non-setting, hydrophobic coating slurry with proper viscosity and sufficient particle dispersion. For example, the non-setting, hydrophobic coating slurry preferably has a Sheen cup reading of 20 seconds or less and does not visually settle. A higher Therefore, preferred non-setting, inorganic filler diameters are about 12 microns to about 35 microns, preferably about 13 to about 25 microns, more preferably about 15 to about 25 microns and most preferably about 15 to about 20 microns.

Example 3

Two samples were prepared using the formulation in TABLE 5

TABLE 5

Examples Non-Setting, Hydrophobic Coating Formulation

| | Weight percentage | |
|---|---|---|
| Component | Mix 1 | Mix 2 |
| Calcium carbonate having a mean particle size in the range of about 18 microns | 61.8 | 61.8 |
| A styrenated acrylic copolymer dispersion at 47% solids, available From Dow | 32.5 | 32.5 |
| Acrylic polymer Dispersant 1 | 0.3 | |
| Acrylic polymer Dispersant 2 | | 0.3 |
| AQUABLAK ® 5106 colorant | 0.12 | 0.12 |
| Alkoxylated alcohol Defoamer, | 0.6 | 0.6 |
| mildewcide | 0.1 | 0.1 |
| Additional water | 4.7 | 4.7 |

While particular versions of the invention have been shown and described, it will be appreciated by those skilled in the art that changes and modifications may be made thereto without departing from the invention in its broader aspects and as set forth in the following claims.

What is claimed is:

1. A glass mat-faced cementitious board comprising:
(a) a cementitious core, wherein the cementitious core is a gypsum-based core comprising more than 70 wt % gypsum on a water-free basis;
(b) a fibrous glass mat having an inner first surface facing at least one face of the cementitious core and an outer second surface, wherein the inner first surface and the outer second surface are opposed, wherein the fibrous glass mat has only a single layer of the nonwoven fibers and the fibers consist of glass fibers;
(c) a hydrophobic, non-setting coating, which is a non-setting drying finish having an absence of setting composition, resulting from applying to the outer second surface of the fibrous mat a layer of hydrophobic finish composition and drying the applied non-setting applied layer of hydrophobic finish composition, the non-setting applied layer of hydrophobic finish composition consisting essentially of:
(i) 50% to 70% by weight a non-setting, inorganic filler having a mean particle diameter of 15 microns to 25 microns,
  wherein the inorganic, non-setting filler is calcium carbonate,
  wherein the hydrophobic finish composition has an absence of perlite,
(ii) 25% to 40% by weight an aqueous dispersion of a film-forming polymer, said aqueous dispersion having 40 to 50% film-forming polymer solids,
  wherein the film-forming polymer is styrenated acrylic copolymer,
(iii) 0% to 10% by weight additional water;
(iv) an absence of fly ash,
(v) an absence of pozzolanic material,
(vi) an absence of hydraulic cement,
(vii) an absence of calcium sulfate hemihydrate, and
(viii) an absence of calcium sulfate anhydrite; and
  wherein the hydrophobic surface coating adheres to the outer second surface of the fibrous glass mat and the cementitious core adheres to the opposed inner first surface of the fibrous glass mat,
  wherein surface water absorption of the hydrophobic, non-setting coating according to the Cobb method is less than 0.5 grams.

2. The glass mat-faced cementitious board of claim 1, wherein the fibrous glass mat comprises:
(1) a fibrous mat substrate having non-woven glass fibers, and
(2) a binder pre-coating comprising (a) polymer binder and (b) a setting or non-setting inorganic filler, wherein the binder pre-coating uniformly penetrates the fibrous mat substrate from the outer second surface of the fibrous mat to a depth which is a fraction of the thickness of the fibrous mat, the binder pre-coating is present in an amount of about 40 lbs/MSF to about 165 lbs/MSF of the fibrous mat, wherein penetration of the binder pre-coating into the mat thickness is 10 percent to 75 percent of the mat thickness; and
wherein the hydrophobic, non-setting coating is adjacent the binder pre-coating.

3. The glass mat-faced cementitious board of claim 1, wherein the fibrous glass mat is a first fibrous mat, wherein the hydrophobic, non-setting coating is a first hydrophobic, non-setting coating, and wherein the mat-faced cementitious board further comprises:
(d) a second fibrous mat having an inner first surface facing at least one face of the cementitious core, and an outer second surface, wherein the inner first surface and the outer second surface of the second fibrous mat are facing opposing faces of the cementitious core;
(e) a second hydrophobic, non-setting coating resulting from applying to the outer second surface of the second fibrous mat a layer of the hydrophobic finish composition; and
  wherein the second hydrophobic surface coating adheres to the outer second surface of the second fibrous mat and a surface of the cementitious core opposed to the first fibrous mat adheres to the opposed inner first surface of the second fibrous mat.

4. The glass mat-faced cementitious board of claim 3, wherein the second fibrous mat comprises:
(1) a fibrous mat substrate having non-woven glass fibers, and
(2) a binder pre-coating comprising (a) polymer binder and (b) a setting or non-setting inorganic filler, wherein the binder pre-coating uniformly penetrates the fibrous mat substrate from the outer second surface of the fibrous mat to a depth which is a fraction of the thickness of the fibrous mat, the binder pre-coating is present in an amount of about 40 lbs/MSF to about 165 lbs/MSF of the fibrous mat, wherein penetration of the binder pre-coating into the mat thickness is 10 percent to 75 percent of the mat thickness; and
wherein the second hydrophobic, non-setting coating is adjacent the binder pre-coating of the second fibrous mat.

5. The glass mat-faced cementitious board of claim 1, wherein there is in the hydrophobic finish (ix) additive selected from the group consisting of: a water reducing admixture additive; a colorant; a fungicide, a mildewcide, and any combination thereof.

6. The glass mat-faced cementitious board of claim 1, wherein the cementitious core is a gypsum-based core comprising more than 80 wt % gypsum on a water-free basis.

7. The glass mat-faced cementitious board of claim 1, wherein the cementitious core is a gypsum-based core comprising more than 90 wt % gypsum on a water-free basis.

8. The glass mat-faced cementitious board of claim 1, wherein the mean particle diameter of the inorganic, non-setting filler is 18 to 25 microns.

9. The glass mat-faced cementitious board of claim 1, wherein the mean particle diameter of the inorganic, non-setting filler is 15 microns to 20 microns.

10. The glass mat-faced cementitious board of claim 1, wherein the cementitious core is a gypsum-based core comprising more than 95 wt % gypsum-on a water-free basis.

11. The glass mat-faced cementitious board of claim 9, wherein the cementitious core is a gypsum-based core comprising more than 95 wt % gypsum on a water-free basis.

12. A method of preparing the glass mat-faced cementitious board of claim 1, comprising:
(a) preparing the board comprising the fibrous glass mat having the inner first surface facing at least one face of the cementitious core and the outer second surface, wherein the inner first surface and the outer second surface are opposed;
(b) applying the hydrophobic finish to the outer second surface of the fibrous glass mat; and
(c) drying the hydrophobic finish to produce the hydrophobic, non-setting coating to form the mat-faced cementitious board.

13. The method of claim 12, wherein the hydrophobic finish is applied to the outer second surface of the fibrous glass mat between 75 lbs/MSF and 150 lbs/MSF.

14. The method of claim 12, wherein the fibrous glass mat comprises:
(1) a fibrous glass mat substrate having non-woven glass fibers, and
(2) a binder pre-coating comprising (a) polymer binder and (b) a setting or non-setting inorganic filler, wherein the binder pre-coating uniformly penetrates the fibrous glass mat substrate from the outer second surface of the fibrous glass mat to a depth which is a fraction of the thickness of the fibrous glass mat, the binder pre-coating is present in an amount of about 40 lbs/MSF to about 165 lbs/MSF of the fibrous glass mat, wherein penetration of the binder pre-coating into the mat thickness is 10 percent to 75 percent of the mat thickness; and
wherein the hydrophobic finish is adjacent the binder pre-coating of the fibrous mat.

15. The method of claim 12,
wherein the fibrous glass mat is a first fibrous glass mat;
wherein the hydrophobic, non-setting coating is a first hydrophobic, non-setting coating;
wherein the board further comprises: a second fibrous glass mat having an inner first surface facing at least one face of the cementitious core, and an outer second surface, wherein the inner first surface and the outer second surface of the second fibrous glass mat are facing opposing faces of the cementitious core; and
wherein the method further comprises (c) providing a second hydrophobic, non-setting coating resulting from applying the hydrophobic finish to the outer second surface of the second fibrous glass mat and drying the hydrophobic finish on the outer second surface of the second fibrous glass mat.

16. The method of claim 15,
wherein the second fibrous glass mat comprises:
(1) a fibrous glass mat substrate having non-woven glass fibers, and
(2) a binder pre-coating comprising (a) polymer binder and (b) a setting or non-setting inorganic filler, wherein the binder pre-coating uniformly penetrates the fibrous glass mat substrate from the outer second surface of the fibrous glass mat to a depth which is a fraction of the thickness of the fibrous glass mat, the binder pre-coating is present in an amount of about 40 lbs/MSF to about 165 lbs/MSF of the fibrous glass mat, wherein penetration of the binder pre-coating into the glass mat thickness is 10 percent to 75 percent of the glass mat thickness; and
wherein the hydrophobic finish is adjacent the binder pre-coating of the second fibrous glass mat.

17. The glass mat-faced cementitious board of claim 6, wherein the hydrophobic finish composition consists of:
(i) 50% to 70% by weight non-setting, inorganic filler having a mean particle diameter of 15 microns to 25 microns,
wherein the inorganic, non-setting filler is calcium carbonate,
wherein the hydrophobic finish composition has an absence of perlite,
(ii) 25% to 40% by weight aqueous dispersion of the film-forming polymer, said aqueous dispersion having 40 to 50% film-forming polymer solids,
wherein the film-forming polymer is styrenated acrylic copolymer,
(iii) 0% to 10% by weight additional water;
(iv) with the absence of fly ash,
(v) with the absence of pozzolanic material,
(vi) with the absence of hydraulic cement,
(vii) with the absence of calcium sulfate hemihydrate,
(viii) with the absence of calcium sulfate anhydrite, and (ix) optionally additive selected from the group consisting of: a water reducing admixture additive; a colorant; a fungicide, a mildewcide, and any combination thereof.

18. The method of claim 12, wherein the cementitious core is a gypsum-based core comprising more than 80 wt % gypsum on a water-free basis.

19. The method of claim 12, wherein the cementitious core is a gypsum-based core comprising more than 95 wt % gypsum on a water-free basis, wherein the inorganic filler has a mean particle diameter of 18 microns to 25 microns.

* * * * *